US011944049B2

(12) United States Patent
Coffin et al.

(10) Patent No.: US 11,944,049 B2
(45) Date of Patent: Apr. 2, 2024

(54) VERTICAL GROW TOWER CONVEYANCE SYSTEM FOR CONTROLLED ENVIRONMENT AGRICULTURE INCLUDING TOWER SHUTTLE

(71) Applicant: MJNN LLC, South San Francisco, CA (US)

(72) Inventors: Gage Goodspeed Coffin, Los Altos Hills, CA (US); Alexandre Le Roux, Redwood City, CA (US); Tamara Tahir Hasoon, Redwood City, CA (US); Michael Peter Flynn, Palo Alto, CA (US); Andrew Dubel, Pacifica, CA (US); Roger Lee, Mountain View, CA (US)

(73) Assignee: MJNN LLC, South San Francisco, CA (US)

( * ) Notice: Subject to any disclaimer, the term of this patent is extended or adjusted under 35 U.S.C. 154(b) by 218 days.

(21) Appl. No.: 17/640,107

(22) PCT Filed: Sep. 10, 2020

(86) PCT No.: PCT/US2020/050222
§ 371 (c)(1),
(2) Date: Mar. 3, 2022

(87) PCT Pub. No.: WO2021/055235
PCT Pub. Date: Mar. 25, 2021

(65) Prior Publication Data

US 2022/0330503 A1     Oct. 20, 2022

Related U.S. Application Data

(60) Provisional application No. 62/903,579, filed on Sep. 20, 2019.

(51) Int. Cl.
A01G 9/029 (2018.01)
A01G 31/04 (2006.01)
A01G 31/06 (2006.01)

(52) U.S. Cl.
CPC ........... *A01G 31/045* (2013.01); *A01G 31/06* (2013.01)

(58) Field of Classification Search
CPC ...... A01G 9/0299; A01G 31/00; A01G 31/04; A01G 31/042; A01G 31/045; A01G 9/024; B65G 17/20; B65G 23/14; B65G 33/02
See application file for complete search history.

(56) References Cited

U.S. PATENT DOCUMENTS 2,244,677 A    6/1941   Cornell
3,254,448 A    6/1966   Othmar
(Continued)

FOREIGN PATENT DOCUMENTS

CN    101647386 A    2/2010
CN    103615128 B    12/2015
(Continued)

OTHER PUBLICATIONS

International Application No. PCT/US2019/023201, Search Report dated Oct. 4, 2019, 6 pgs.
(Continued)

*Primary Examiner* — Kristen C Hayes
(74) *Attorney, Agent, or Firm* — Almanac IP Advisors LLP

(57) ABSTRACT

A vertical farming structure having vertical grow towers and associated conveyance mechanisms for moving the vertical grow towers through a controlled environment, while being exposed to controlled conditions, such as lighting, airflow, humidity and nutritional support. The present disclosure
(Continued)

describes a reciprocating cam mechanism that provides a cost-efficient mechanism for conveying vertical grow towers in the controlled environment. The reciprocating cam mechanism can be arranged to increase the spacing of the grow towers as they are conveyed through the controlled environment to index the crops growing on the towers. The present disclosure also describes a tower shuttle mechanism that provides operational flexibility by decoupling the loading and unloading operations of the grow towers from the vertical farming structure and, therefore, allowing multiple grow towers to be extracted for harvesting in a batch process before loading new grow towers into the vertical farming structure in a separate process.

22 Claims, 13 Drawing Sheets

(56) References Cited

U.S. PATENT DOCUMENTS

| | | | |
|---|---|---|---|
| 3,824,736 | A | 7/1974 | Davis |
| 4,075,785 | A | 2/1978 | Jones |
| 4,454,684 | A | 6/1984 | OHare |
| 4,965,962 | A | 10/1990 | Akagi |
| 5,502,923 | A | 4/1996 | Bradshaw |
| 5,555,676 | A | 9/1996 | Lund |
| 5,617,673 | A | 4/1997 | Takashima |
| 5,862,628 | A | 1/1999 | Takashima |
| 6,061,957 | A | 5/2000 | Takashima |
| 6,276,410 | B1 * | 8/2001 | Esmeralda .............. B67C 11/02 141/105 |
| 7,049,743 | B2 | 5/2006 | Uchiyama |
| 7,243,460 | B2 | 7/2007 | Darlington |
| 7,415,796 | B2 | 8/2008 | Brusatore |
| 7,533,493 | B2 | 5/2009 | Brusatore |
| 7,536,827 | B2 | 5/2009 | Busch et al. |
| 7,559,173 | B2 | 7/2009 | Brusatore |
| 7,785,207 | B2 | 8/2010 | Henry et al. |
| 7,921,601 | B2 | 4/2011 | Henry et al. |
| 8,074,398 | B2 | 12/2011 | Hazan |
| 8,122,642 | B1 | 2/2012 | Huberman et al. |
| 8,141,294 | B2 | 3/2012 | Bribach et al. |
| 8,151,518 | B2 | 4/2012 | Adams et al. |
| 8,234,813 | B2 | 8/2012 | Busch et al. |
| 8,250,808 | B2 | 8/2012 | Kania et al. |
| 8,250,809 | B2 | 8/2012 | Simmons |
| 8,327,579 | B2 | 12/2012 | Kania et al. |
| 8,327,582 | B2 | 12/2012 | Storey |
| 8,627,598 | B1 | 1/2014 | Souder et al. |
| 8,689,485 | B2 | 4/2014 | Friedman |
| 8,756,862 | B1 | 6/2014 | Huberman et al. |
| 9,043,962 | B2 * | 6/2015 | Trofe .................... A01G 9/023 |
| 9,282,699 | B2 | 3/2016 | Anderson et al. |
| 9,357,715 | B2 | 6/2016 | Cottrell |
| 9,359,759 | B2 | 6/2016 | Otamendi |
| 9,374,952 | B1 | 6/2016 | Cross |
| 9,380,751 | B2 | 7/2016 | Storey |
| 9,445,557 | B2 | 9/2016 | Darlington |
| 9,468,154 | B2 | 10/2016 | Carpenter |
| 9,474,217 | B2 | 10/2016 | Anderson et al. |
| 9,491,915 | B2 | 11/2016 | Storey |
| 9,510,524 | B2 | 12/2016 | Anderson et al. |
| 9,591,814 | B2 | 3/2017 | Collins et al. |
| 9,730,400 | B2 | 8/2017 | Wilson et al. |
| 9,814,186 | B2 | 11/2017 | Anderson et al. |
| 9,854,750 | B2 | 1/2018 | Brusatore |
| 9,924,639 | B1 | 3/2018 | Arrighi |
| 9,974,243 | B2 | 5/2018 | Martin |
| 10,022,873 | B2 | 7/2018 | Larrea-Tamayo et al. |
| 10,136,587 | B1 * | 11/2018 | Johnson ............... A01G 25/165 |
| 2004/0103583 | A1 | 6/2004 | Eriksen et al. |
| 2005/0268547 | A1 | 12/2005 | Uchiyama |
| 2006/0162252 | A1 | 7/2006 | Lim |
| 2006/0201058 | A1 | 9/2006 | Ripatti |
| 2007/0033866 | A1 | 2/2007 | Henry et al. |
| 2007/0033867 | A1 | 2/2007 | Henry et al. |
| 2007/0051036 | A1 | 3/2007 | Henry et al. |
| 2007/0051037 | A1 | 3/2007 | Henry et al. |
| 2007/0051038 | A1 | 3/2007 | Henry et al. |
| 2008/0086942 | A1 | 4/2008 | Maier |
| 2009/0139927 | A1 | 6/2009 | Kania et al. |
| 2009/0223126 | A1 | 9/2009 | Garner et al. |
| 2011/0005132 | A1 | 1/2011 | Kania et al. |
| 2011/0005133 | A1 | 1/2011 | Kania et al. |
| 2011/0005134 | A1 | 1/2011 | Kania et al. |
| 2011/0005444 | A1 | 1/2011 | Kania et al. |
| 2011/0005446 | A1 | 1/2011 | Kania et al. |
| 2011/0005447 | A1 | 1/2011 | Kania et al. |
| 2011/0005449 | A1 | 1/2011 | Kania et al. |
| 2011/0131876 | A1 | 6/2011 | Pettibone |
| 2011/0146559 | A1 | 6/2011 | Kania et al. |
| 2012/0167460 | A1 | 7/2012 | Omidi |
| 2012/0279122 | A1 | 11/2012 | Benne et al. |
| 2012/0285084 | A1 | 11/2012 | Hu |
| 2013/0019527 | A1 | 1/2013 | Howe-Sylvain |
| 2013/0067814 | A1 | 3/2013 | Riley et al. |
| 2013/0298462 | A1 | 11/2013 | Moran |
| 2014/0000162 | A1 | 1/2014 | Blank |
| 2014/0137472 | A1 | 5/2014 | Anderson et al. |
| 2014/0223816 | A1 | 8/2014 | Parker |
| 2014/0259904 | A1 | 9/2014 | Collard |
| 2014/0318010 | A1 | 10/2014 | Tomlinson |
| 2014/0366443 | A1 | 12/2014 | Brusatore |
| 2015/0027051 | A1 | 1/2015 | Anderson et al. |
| 2015/0230419 | A1 | 8/2015 | Shizaka et al. |
| 2015/0351329 | A1 | 12/2015 | Heidl et al. |
| 2016/0000018 | A1 | 1/2016 | Elmpt et al. |
| 2016/0073589 | A1 | 3/2016 | Mcnamara et al. |
| 2016/0135393 | A1 | 5/2016 | Ruanova |
| 2016/0135398 | A1 | 5/2016 | Mathieu et al. |
| 2016/0192594 | A1 | 7/2016 | Mawendra |
| 2016/0212946 | A1 | 7/2016 | Higgins |
| 2016/0227722 | A1 | 8/2016 | Storey |
| 2016/0235025 | A1 | 8/2016 | Bray |
| 2016/0270304 | A1 | 9/2016 | Higgins |
| 2017/0000038 | A1 | 1/2017 | Collard |
| 2017/0013810 | A1 | 1/2017 | Grabell et al. |
| 2017/0020082 | A1 | 1/2017 | Storey |
| 2017/0027119 | A1 | 2/2017 | Storey |
| 2017/0055460 | A1 | 3/2017 | Brusatore |
| 2017/0055461 | A1 | 3/2017 | Neuhoff, Jr. et al. |
| 2017/0055474 | A1 | 3/2017 | Storey |
| 2017/0064912 | A1 | 3/2017 | Tabakman |
| 2017/0086399 | A1 | 3/2017 | Anderson et al. |
| 2017/0181393 | A1 | 6/2017 | Nelson |
| 2017/0202162 | A1 | 7/2017 | Dufresne et al. |
| 2017/0231167 | A1 | 8/2017 | Storey |
| 2017/0231168 | A1 | 8/2017 | Storey |
| 2017/0303484 | A1 | 10/2017 | Wilson et al. |
| 2017/0303485 | A1 | 10/2017 | Wilson et al. |
| 2017/0339841 | A1 | 11/2017 | Monasterio |
| 2017/0347537 | A1 | 12/2017 | Beaulieu |
| 2018/0007850 | A1 | 1/2018 | Dufresne et al. |
| 2018/0014471 | A1 | 1/2018 | Jensen et al. |
| 2018/0014485 | A1 * | 1/2018 | Whitcher ............... A01G 9/023 |
| 2018/0014486 | A1 * | 1/2018 | Creechley ............. A01G 9/249 |
| 2018/0042186 | A1 | 2/2018 | Kop |
| 2018/0077884 | A1 | 3/2018 | Barker et al. |
| 2018/0084713 | A1 | 3/2018 | Ito et al. |
| 2018/0084739 | A1 | 3/2018 | Bottari |
| 2018/0098513 | A1 | 4/2018 | Ritchie |
| 2018/0098515 | A1 | 4/2018 | Anderson et al. |
| 2018/0146618 | A1 | 5/2018 | Elazary et al. |
| 2018/0153113 | A1 | 6/2018 | Storey et al. |
| 2018/0153115 | A1 | 6/2018 | Edke et al. |
| 2018/0168108 | A1 | 6/2018 | Foreman et al. |
| 2018/0206414 | A1 | 7/2018 | Goodman et al. |
| 2019/0029198 | A1 | 1/2019 | Van Wingerden |

(56) References Cited

U.S. PATENT DOCUMENTS

2021/0094810 A1\*  4/2021  Pelle ..................... B67C 11/00
2021/0379510 A1\* 12/2021  Dolan .................... B67C 11/02

FOREIGN PATENT DOCUMENTS

| EP | 0610137 A1 | 8/1994 |
|---|---|---|
| EP | 3036990 A2 | 6/2016 |
| JP | H0614663 A | 1/1994 |
| WO | 2013113096 A1 | 8/2013 |
| WO | 2017205420 A1 | 11/2017 |
| WO | 2017217130 A1 | 12/2017 |
| WO | 2018037577 A1 | 3/2018 |
| WO | 2018175794 A1 | 9/2018 |
| WO | 2019183244 A2 | 9/2019 |

OTHER PUBLICATIONS

International Application No. PCT/US2019/023201, Written Opinion dated Oct. 4, 2019, 11 pgs.
International Application No. PCT/US2019/058764, Search Report dated Apr. 3, 2020, 6 pgs.
International Application No. PCT/US2019/058770, Search Report dated Jan. 13, 2020, 2 pgs.
International Application No. PCT/US2019/058770, Written Opinion dated Jan. 13, 2020, 8 pgs.
International Application No. PCT/US2020/050222, Search Report dated Nov. 24, 2020, 3 pgs.
International Application No. PCT/US2020/050222, Written Opinion dated Nov. 24, 2020, 7 pgs.

\* cited by examiner

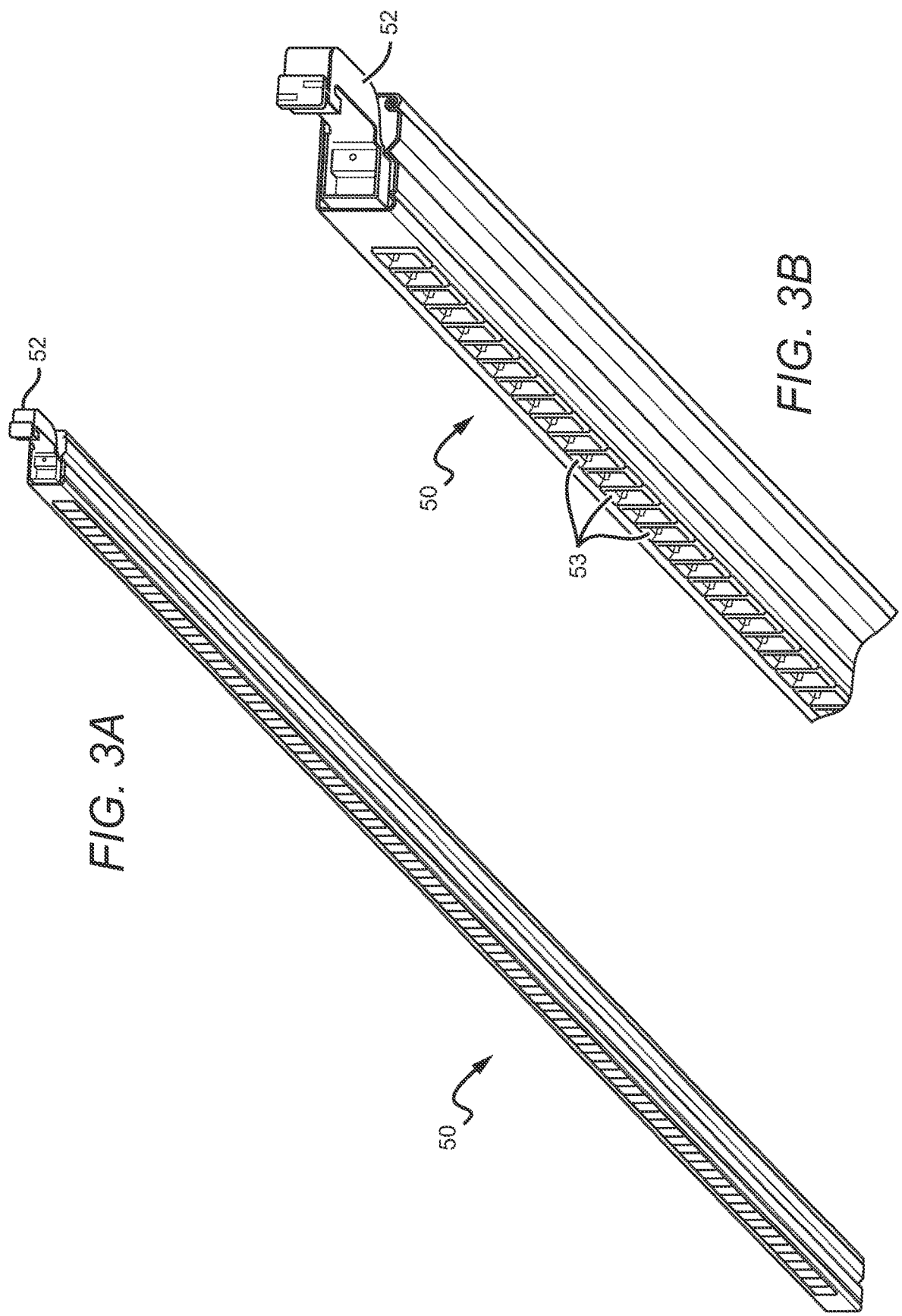

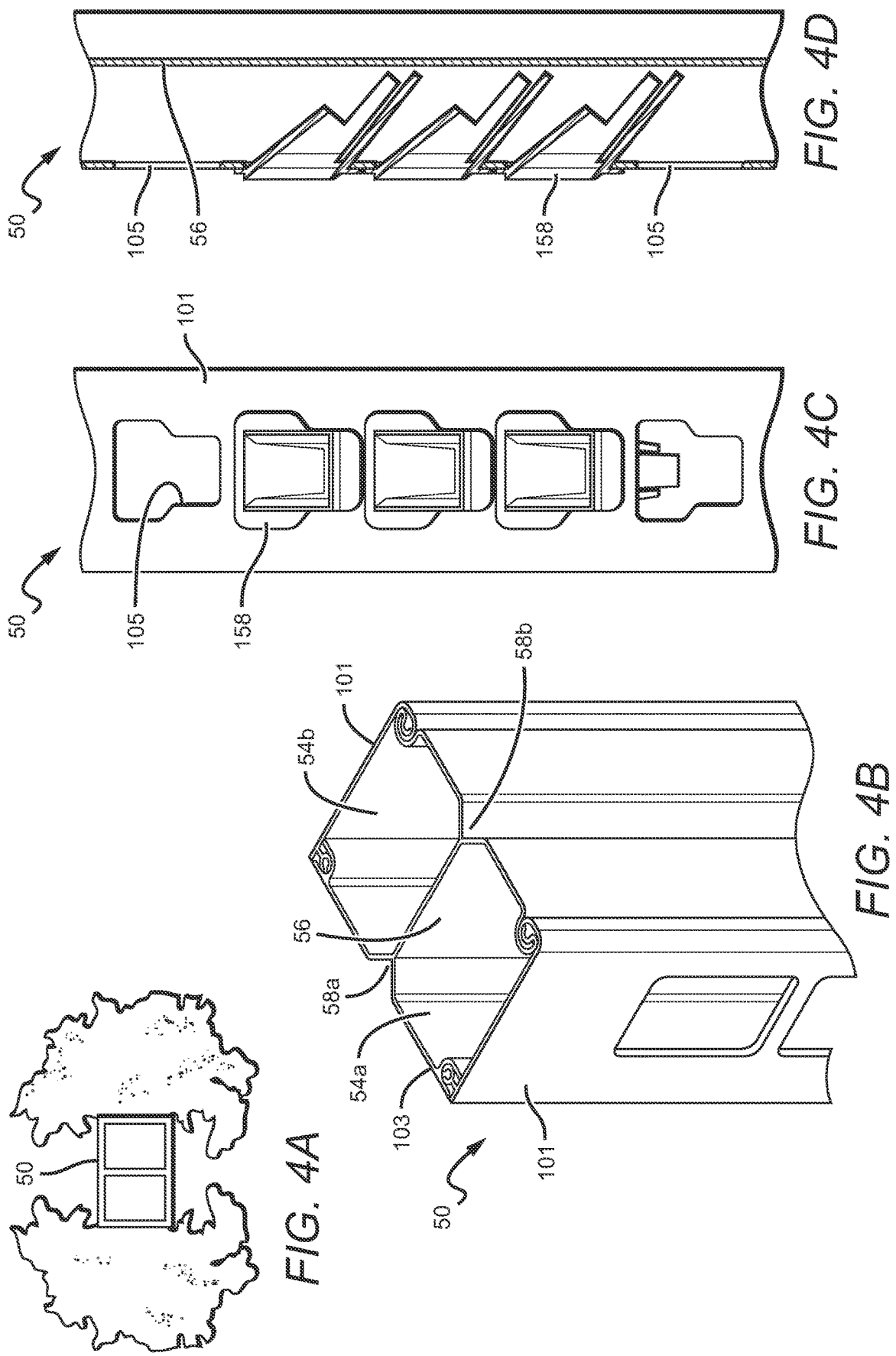

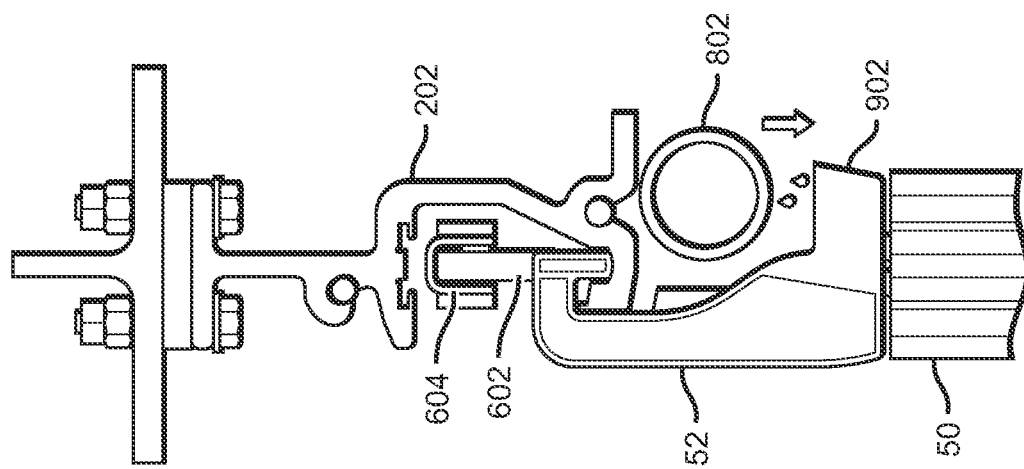
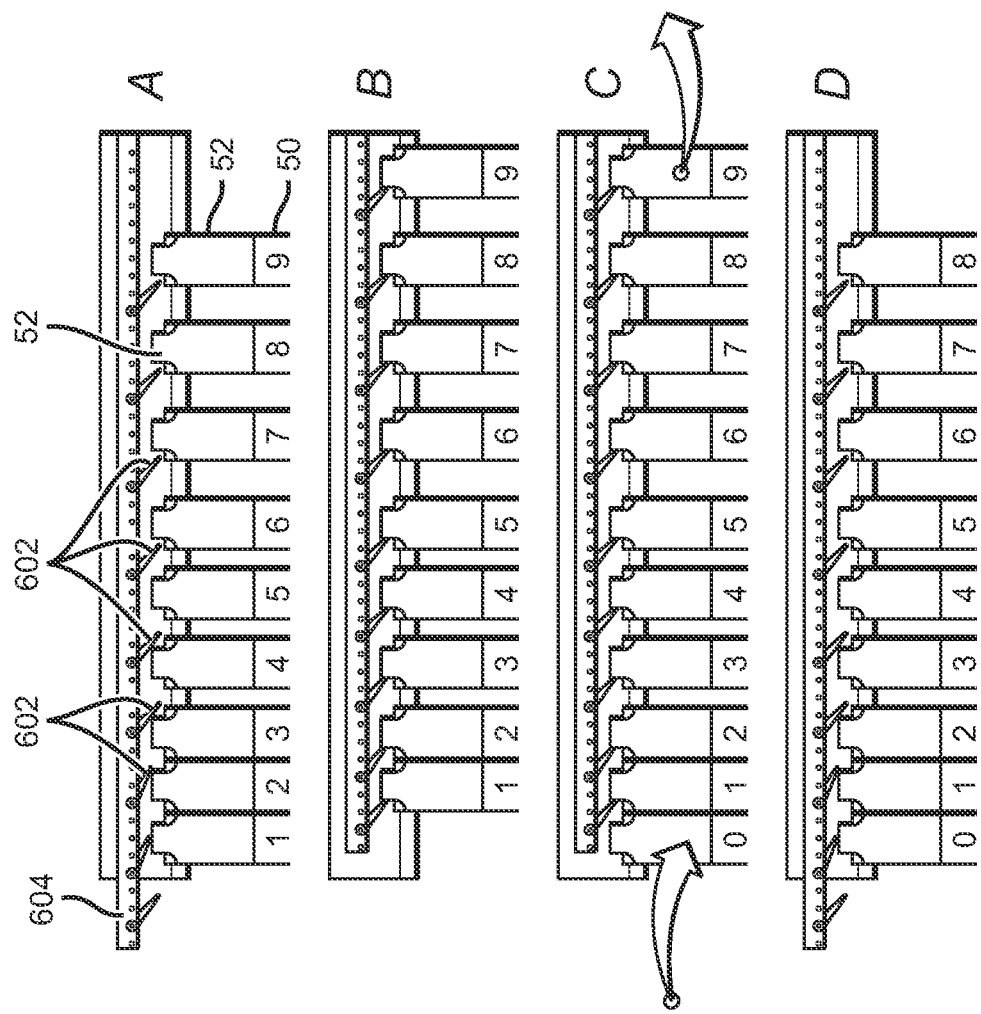

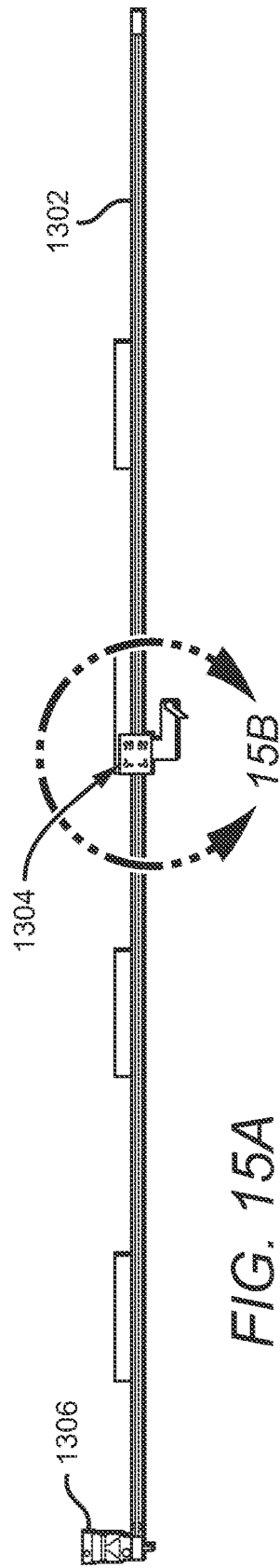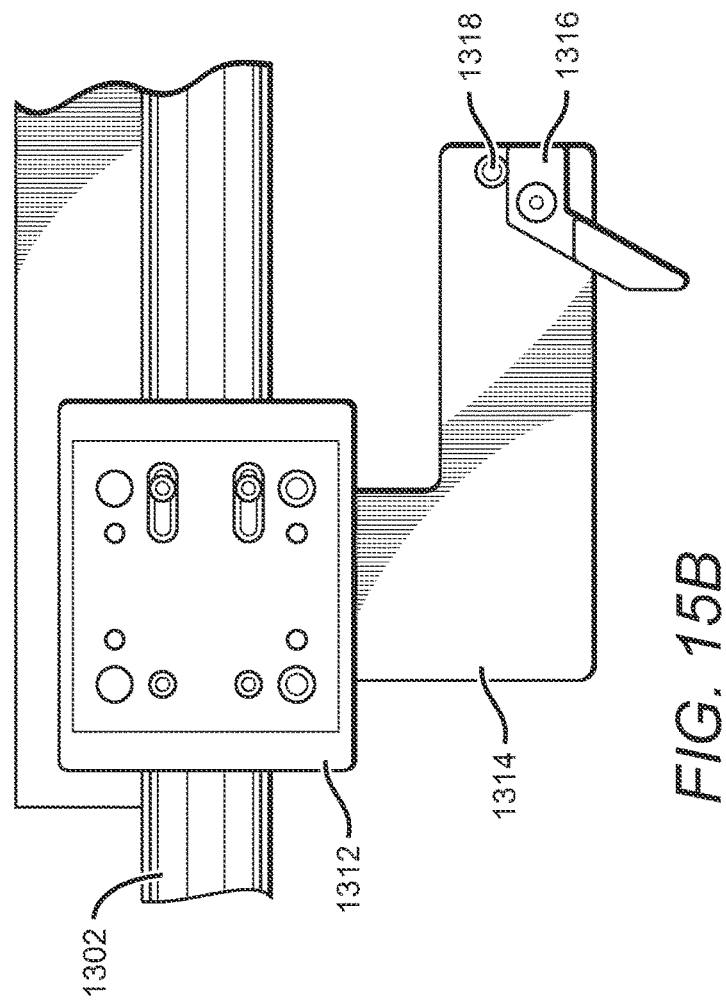
FIG. 15A
FIG. 15B

VERTICAL GROW TOWER CONVEYANCE SYSTEM FOR CONTROLLED ENVIRONMENT AGRICULTURE INCLUDING TOWER SHUTTLE

CROSS-REFERENCE TO RELATED APPLICATION

The present application is the National Stage of International Application No. PCT/US2020/050222, filed Sep. 10, 2020, which claims priority to U.S. provisional application Ser. No. 62/903,579 filed Sep. 20, 2019, which is incorporated herein by reference for all purposes.

BACKGROUND

Field of the Disclosure

The disclosure relates generally to controlled environment agriculture and, more particularly, to loading and conveyance systems for vertical plant production systems.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

During the twentieth century, agriculture slowly began to evolve from a conservative industry to a fast-moving high-tech industry. Global food shortages, climate change and societal changes drove a move away from manually-implemented agriculture techniques toward computer-implemented technologies. In the past, and in many cases still today, farmers only had one growing season to produce the crops that would determine their revenue and food production for the entire year. However, this is changing. With indoor growing as an option and with better access to data processing technologies, the science of agriculture has become more agile. It is adapting and learning as new data is collected and insights are generated.

Advancements in technology are making it feasible to control the effects of nature with the advent of "controlled environment agriculture." Improved efficiencies in space utilization, lighting, and a better understanding of hydroponics, aeroponics, crop cycles, and advancements in environmental control systems have allowed humans to better recreate environments conducive for agriculture crop growth with the goals of greater yield per square foot, better nutrition and lower cost.

US Patent Publication Nos. 2018/0014485 and 2018/0014486, both assigned to the assignee of the present disclosure and incorporated by reference in their entirety herein, describe environmentally controlled vertical farming systems. The vertical farming structure (e.g., a vertical column) may be moved about an automated conveyance system in an open or closed-loop fashion, exposed to precision-controlled lighting, airflow and humidity, with ideal nutritional support.

US Patent Pub. No. US 2017/0055460 ("Brusatore") describes a system for continuous automated growing of plants. A vertical array of plant supporting arms extends radially from a central axis. Each arm includes pot receptacles which receive the plant seedling, and liquid nutrients and water. The potting arms are rotated beneath grow lamps and pollinating arms. However, the spacing between plants appears to be fixed.

SUMMARY OF THE DISCLOSURE

The present disclosure is directed to a vertical farming structure having vertical grow towers and associated conveyance mechanisms for moving the vertical grow towers through a controlled environment, while being exposed to controlled conditions, such as lighting, airflow, humidity and nutritional support. The present disclosure describes a reciprocating cam mechanism that provides a cost-efficient mechanism for conveying vertical grow towers in the controlled environment. The reciprocating cam mechanism can be arranged to increase the spacing of the grow towers as they are conveyed through the controlled environment to index the crops growing on the towers. The present disclosure also describes a tower shuttle mechanism that provides operational flexibility by decoupling the loading and unloading operations of the grow towers from the vertical farming structure and, therefore, allowing multiple grow towers to be extracted for harvesting in a batch process before loading new grow towers into the vertical farming structure in a separate process.

BRIEF DESCRIPTION OF THE DRAWINGS

FIGS. 3A and 3B are perspective views of an example grow tower.

FIG. 4A is a top view of an example grow tower; FIG. 4B is a perspective, top view of an example grow tower; FIG. 4C is an elevation view of a section of an example grow tower; and FIG. 4D is a sectional, elevation view of a portion of an example grow tower.

FIG. 7A is a sequence diagram illustrating operation of an example reciprocating cam mechanism.

FIG. 8 is a profile view of an example grow line and irrigation supply line.

FIG. 15A is a side elevation view of an example tower shuttle mechanism; and FIG. 15B is a sectional view illustrating the carriage assembly of the example tower shuttle mechanism.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Figure 1:
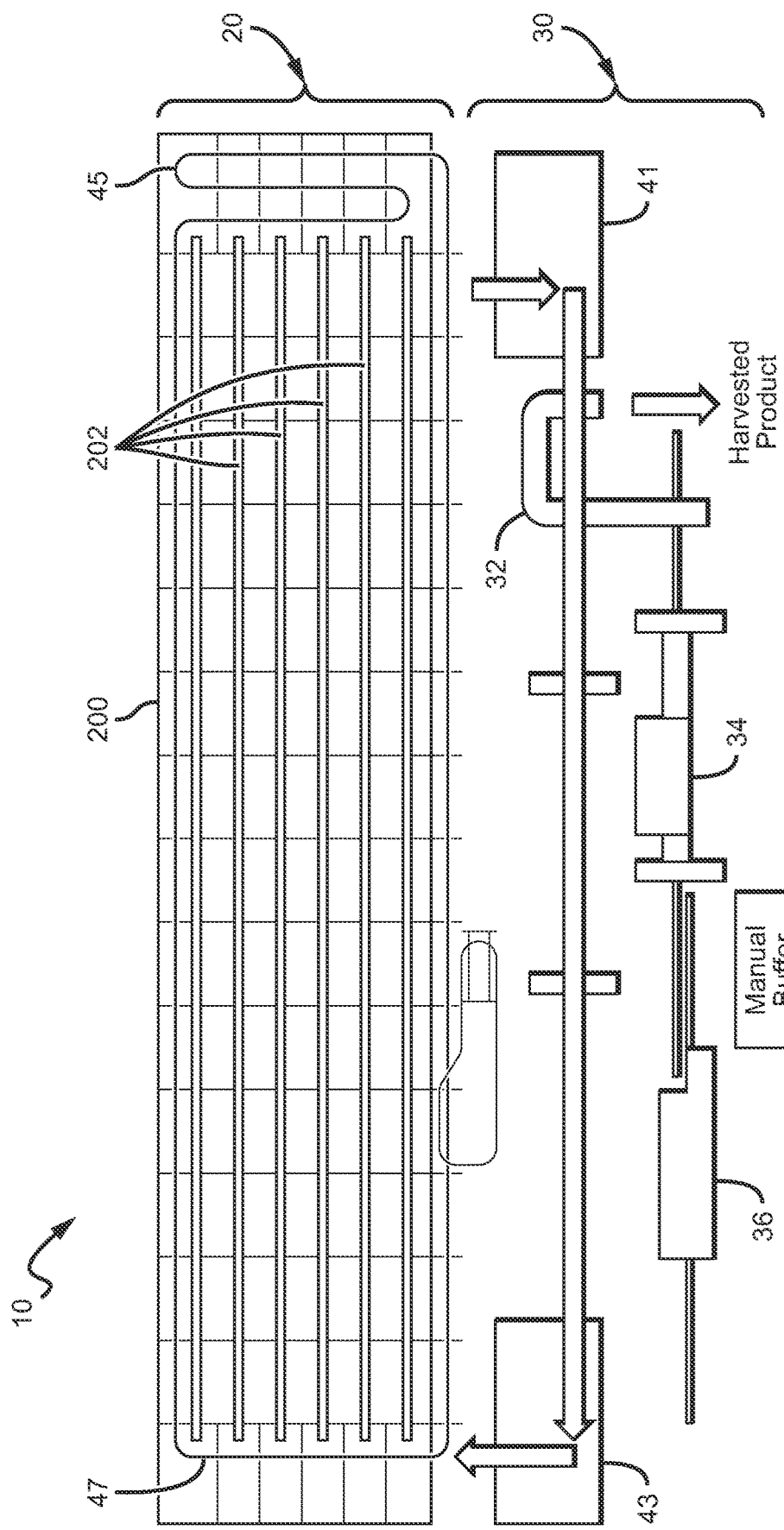
FIG. 1 is a functional block diagram illustrating an example controlled environment agriculture system.
Figure 2:
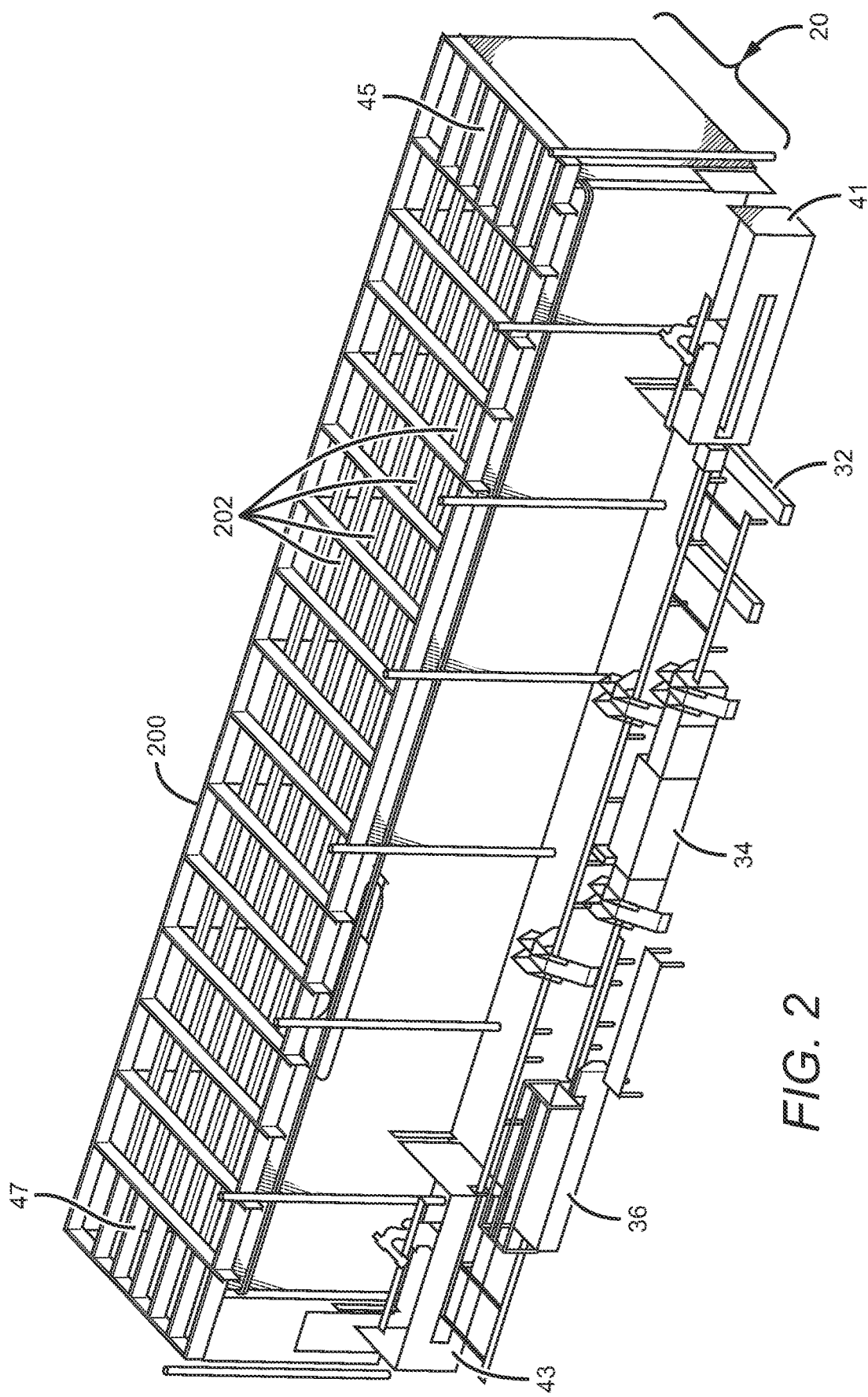
FIG. 2 is a perspective view of an example controlled environment agriculture system.

The following describes a vertical farm production system configured for high density growth and crop yield. FIGS. 1 and 2 illustrate a controlled environment agriculture system 10 according to one possible embodiment of the invention. At a high level, the system 10 may include an environmentally-controlled growing chamber 20, a vertical tower conveyance system 200 disposed within the growing chamber 20 and configured to convey grow towers 50 with crops disposed therein, and a central processing facility 30. The crops or plants species that may be grown may be gravitropic/geotropic and/or phototropic, or some combination thereof. The crops or plant species may vary considerably and include various leaf vegetables, fruiting vegetables, flowering crops, fruits and the like. The controlled environment agriculture system 10 may be configured to grow a single crop type at a time or to grow multiple crop types concurrently.

The system 10 may also include conveyance systems for moving the grow towers in a circuit throughout the crop's growth cycle, the circuit comprising a staging area configured for loading the grow towers 50 into and out of the vertical tower conveyance mechanism 200.

The central processing system 30 may include one or more conveyance mechanisms for directing grow towers 50 to stations in the central processing system 30—e.g., stations for loading plants into, and harvesting crops from, the grow towers 50. The vertical tower conveyance system 200, within the growing chamber 20, is configured to support and translate one or more grow towers 50 along grow lines 202. Each grow tower 50 is configured for containing plant growth media that supports a root structure of at least one crop plant growing therein. Each grow tower 50 is also configured to releasably attach to a grow line 202 in a vertical orientation and move along the grow line 202 during a growth phase. Together, the vertical tower conveyance mechanism 200 and the central processing system 30 (including associated conveyance mechanisms) can be arranged in a production circuit under control of one or more computing systems.

The growth environment 20 may include light emitting sources positioned at various locations between and along the grow lines 202 of the vertical tower conveyance system 200. The light emitting sources can be positioned laterally relative to the grow towers 50 in the grow line 202 and configured to emit light toward the lateral faces of the grow towers 50 that include openings from which crops grow. The light emitting sources may be incorporated into a water-cooled, LED lighting system as described in U.S. Publ. No. 2017/0146226A1, the disclosure of which is incorporated by reference herein. In such an embodiment, the LED lights may be arranged in a bar-like structure. The bar-like structure may be placed in a vertical orientation to emit light laterally to substantially the entire length of adjacent grow towers 50. Multiple light bar structures may be arranged in the growth environment 20 along and between the grow lines 202. Other lighting systems and configurations may be employed. For example, the light bars may be arranged horizontally between grow lines 202.

The growth environment 20 may also include a nutrient supply system configured to supply an aqueous crop nutrient solution to the crops as they translate through the growth chamber 20. As discussed in more detail below, the nutrient supply system may apply aqueous crop nutrient solution to the top of the grow towers 50. Gravity may cause the solution travel down the vertically-oriented grow tower 50 and through the length thereof to supply solution to the crops disposed along the length of the grow tower 50. The growth environment 20 may also include an airflow source configured to, when a tower is mounted to a grow line 202, direct airflow in the lateral growth direction of growth and through an under-canopy of the growing plant, so as to disturb the boundary layer of the under-canopy of the growing plant. In other implementations, airflow may come from the top of the canopy or orthogonal to the direction of plant growth. The growth environment 20 may also include a control system, and associated sensors, for regulating at least one growing condition, such as air temperature, airflow speed, relative air humidity, and ambient carbon dioxide gas content. The control system may for example include such sub-systems as HVAC units, chillers, fans and associated ducting and air handling equipment. Grow towers 50 may have identifying attributes (such as bar codes or RFID tags). The controlled environment agriculture system 10 may include corresponding sensors and programming logic for tracking the grow towers 50 during various stages of the farm production cycle and/or for controlling one or more conditions of the growth environment. The operation of control system and the length of time towers remain in growth environment can vary considerably depending on a variety of factors, such as crop type and other factors.

As discussed above, grow towers 50 with newly transplanted crops or seedlings are transferred from the central processing system 30 into the vertical tower conveyance system 200. Vertical tower conveyance system 200 moves the grow towers 50 along respective grow lines 202 in growth environment 20 in a controlled fashion, as discussed in more detail below. Crops disposed in grow towers 50 are exposed to the controlled conditions of growth environment (e.g., light, temperature, humidity, air flow, aqueous nutrient supply, etc.). The control system is capable of automated adjustments to optimize growing conditions within the growth chamber 20 to make continuous improvements to various attributes, such as crop yields, visual appeal and nutrient content. In addition, US Patent Publication Nos. 2018/0014485 and 2018/0014486 describe application of machine learning and other operations to optimize grow conditions in a vertical farming system. In some implementations, environmental condition sensors may be disposed on grow towers 50 or at various locations in growth environment 20. When crops are ready for harvesting, grow towers 50 with crops to be harvested are transferred from the vertical tower conveyance system 200 to the central processing system 30 for harvesting and other processing operations.

Central processing system 30, as discussed in more detail below, may include processing stations directed to injecting seedlings into towers 50, harvesting crops from towers 50, and cleaning towers 50 that have been harvested. Central processing system 30 may also include conveyance mechanisms that move towers 50 between such processing stations. For example, as FIG. 1 illustrates, central processing system 30 may include harvester station 32, washing station 34, and transplanter station 36. Harvester station 32 may deposit harvested crops into food-safe containers and may include a conveyance mechanism for conveying the containers to post-harvesting facilities (e.g., preparation, washing, packaging and storage) that are beyond the scope of this disclosure.

Controlled environment agriculture system 10 may also include one or more conveyance mechanisms for transferring grow towers 50 between growth environment 20 and central processing system 30. In the implementation shown, the stations of central processing system 30 operate on grow towers 50 in a horizontal orientation. In one implementation, an automated pickup station 43, and associated control logic, may be operative to releasably grasp a horizontal tower from a loading location, rotate the tower to a vertical orientation and attach the tower to a transfer station for insertion into a selected grow line 202 of the growth environment 20. On the other end of growth environment 20, automated laydown station 41, and associated control logic, may be operative to releasably grasp and move a vertically-oriented grow tower 50 from a buffer location, rotate the grow tower 50 to a horizontal orientation and place it on a conveyance system for loading into harvester station 32. In some implementations, if a grow tower 50 is rejected due to quality control concerns, the conveyance system may bypass the harvester station 32 and carry the grow tower to washing station 34 (or some other station). The automated laydown and pickup stations 41 and 43 may each comprise a six-degrees of freedom robotic arm, such as a FANUC robot. The stations 41 and 43 may also include end effectors for releasably grasping grow towers 50 at opposing ends.

Figure 12:
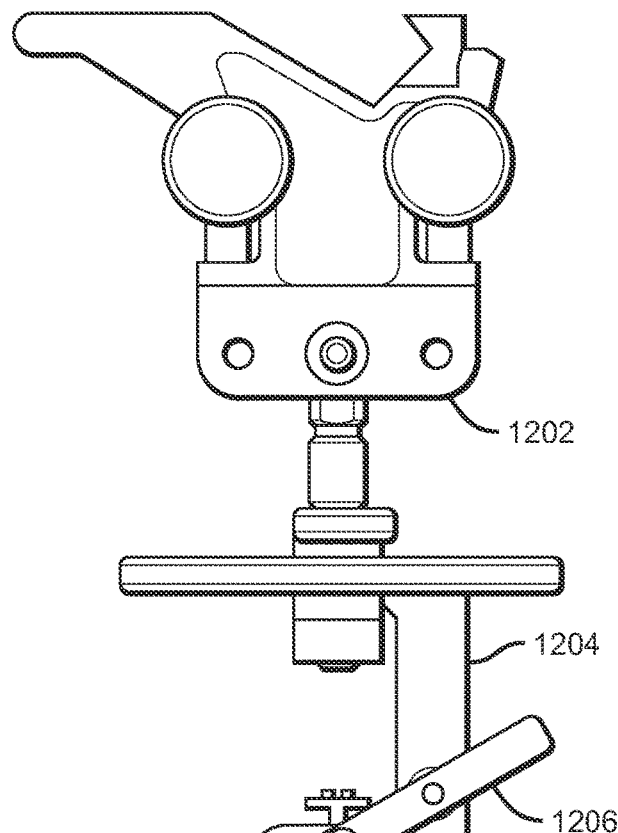
FIG. 12 is an elevation view of an example carriage assembly.

Growth environment 20 may also include automated loading and unloading mechanisms for inserting grow towers 50 into selected grow lines 202 and unloading grow towers 50 from the grow lines 202. In one implementation, the load transfer conveyance mechanism 47 may include a power and free conveyor system that conveys carriages each loaded with a grow tower 50 from the automated pickup station 43 to a selected grow line 202. Vertical grow tower conveyance system 200 may include sensors (such as RFID or bar code sensors) to identify a given grow tower 50 and, under control logic, select a grow line 202 for the grow tower 50. Particular algorithms for grow line selection can vary considerably depending on a number of factors and is beyond the scope of this disclosure. The load transfer conveyance mechanism 47 may also include one or more linear actuators that pushes the grow tower 50 onto a grow line 202. Similarly, the unload transfer conveyance mechanism 45 may include one or more linear actuators that push or pull grow towers from a grow line 202 onto a carriage of another power and free conveyor mechanism, which conveys the carriages 1202 from the grow line 202 to the automated laydown station 41. FIG. 12 illustrates a carriage 1202 that may be used in a power and free conveyor mechanism. In the implementation shown, carriage 1202 includes hook 1204 that engages hook 52 attached to a grow tower 50. A latch assembly 1206 may secure the grow tower 50 while it is being conveyed to and from various locations in the system. In one implementation, one or both of load transfer conveyance mechanism 47 and unload transfer conveyance mechanism 45 may be configured with a sufficient track distance to establish a zone where grow towers 50 may be buffered. For example, unload transfer conveyance mechanism 45 may be controlled such that it unloads a set of towers 50 to be harvested unto carriages 1202 that are moved to a buffer region of the track. On the other end, automated pickup station 43 may load a set of towers to be inserted into growth environment 20 onto carriages 1202 disposed in a buffer region of the track associated with load transfer conveyance mechanism 47.

Grow Towers

Grow towers 50 provide the sites for individual crops to grow in the system. As FIGS. 3A and 3B illustrate, a hook 52 attaches to the top of grow tower 50. Hook 52 allows grow tower 50 to be supported by a grow line 202 when it is inserted into the vertical tower conveyance system 200. In one implementation, a grow tower 50 measures 5.172 meters long, where the extruded length of the tower is 5.0 meters, and the hook is 0.172 meters long. The extruded rectangular profile of the grow tower 50, in one implementation, measures 57 mm×93 mm (2.25"×3.67"). The hook 52 can be designed such that its exterior overall dimensions are not greater than the extruded profile of the grow tower 50. The foregoing dimensions are for didactic purposes. The dimensions of grow tower 50 can be varied depending on a number of factors, such as desired throughput, overall size of the system, and the like.

Grow towers 50 may include a set of grow sites 53 arrayed along at least one face of the grow tower 50. In the implementation shown in FIG. 4A, grow towers 50 include grow sites 53 on opposing faces such that plants protrude from opposing sides of the grow tower 50. Transplanter station 36 may transplant seedlings into empty grow sites 53 of grow towers 50, where they remain in place until they are fully mature and ready to be harvested. In one implementation, the orientation of the grow sites 53 are perpendicular to the direction of travel of the grow towers 50 along grow line 202. In other words, when a grow tower 50 is inserted into a grow line 202, plants extend from opposing faces of the grow tower 50, where the opposing faces are parallel to the direction of travel. Although a dual-sided configuration is preferred, the invention may also be utilized in a single-sided configuration where plants grow along a single face of a grow tower 50.

U.S. application Ser. No. 15/968,425 filed on May 1, 2018 which is incorporated by reference herein for all purposes, discloses an example tower structure configuration that can be used in connection with various embodiments of the invention. In the implementation shown, grow towers 50 may each consist of three extrusions which snap together to form one structure. As shown, the grow tower 50 may be a dual-sided hydroponic tower, where the tower body 103 includes a central wall 56 that defines a first tower cavity 54a and a second tower cavity 54b. FIG. 4B provides a perspective view of an exemplary dual-sided, multi-piece hydroponic grow tower 50 in which each front face plate 101 is hingeably coupled to the tower body 103. In FIG. 4B, each front face plate 101 is in the closed position. The cross-section of the tower cavities 54a, 54b may be in the range of 1.5 inches by 1.5 inches to 3 inches by 3 inches, where the term "tower cavity" refers to the region within the body of the tower and behind the tower face plate. The wall thickness of the grow towers 50 maybe within the range of 0.065 to 0.075 inches. A dual-sided hydroponic tower, such as that shown in FIGS. 4A and 4B, has two back-to-back cavities 54a and 54b, each preferably within the noted size range. In the configuration shown, the grow tower 50 may include (i) a first V-shaped groove 58a running along the length of a first side of the tower body 103, where the first V-shaped groove is centered between the first tower cavity and the second tower cavity; and (ii) a second V-shaped groove 58b running along the length of a second side of the tower body 103, where the second V-shaped groove is centered between the first tower cavity and the second tower cavity. The V-shaped grooves 58a, 58b may facilitate registration, alignment and/or feeding of the towers 50 by one or more of the stations in central processing system 30. U.S. application Ser. No. 15/968,425 discloses additional details regarding the construction and use of towers that may be used in embodiments of the invention. Another attribute of V-shaped grooves 58a, 58b is that they effectively narrow the central wall 56 to promote the flow of aqueous nutrient solution centrally where the plant's roots are located. Other implementations are possible. For example, a grow tower 50 may be formed as a unitary, single extrusion, where the material at the side walls flex to provide a hinge and allow the cavities to be opened for cleaning. U.S. application Ser. No. 16/577,322 filed Sep. 20, 2019 which is incorporated by reference herein for all purposes, discloses an example grow tower 50 formed by a single extrusion.

As FIGS. 4C and 4D illustrate, grow towers 50 may each include a plurality of cut-outs 105 for use with a compatible plug holder 158, such as the plug holder disclosed in any one of co-assigned and co-pending U.S. patent application Ser. Nos. 15/910,308, 15/910,445 and 15/910,796, each filed on 2 Mar. 2018, the disclosures of which is incorporated herein for any and all purposes. As shown, the plug holders 158 may be oriented at a 45-degree angle relative to the front face plate 101 and the vertical axis of the grow tower 50. It should be understood, however, that tower design disclosed in the present application is not limited to use with this particular plug holder or orientation, rather, the towers disclosed herein may be used with any suitably sized and/or oriented plug holder. As such, cut-outs 105 are only meant to illustrate, not limit, the present tower design and it should be understood that the present invention is equally applicable to towers with other cut-out designs. Plug Holder 158 may be ultrasonically welded, bonded, or otherwise attached to tower face 101.

The use of a hinged front face plate simplifies manufacturing of grow towers, as well as tower maintenance in general and tower cleaning in particular. For example, to clean a grow tower 50 the face plates 101 are opened from the body 103 to allow easy access to the body cavity 54a or 54b. After cleaning, the face plates 101 are closed. Since the face plates remain attached to the tower body 103 throughout the cleaning process, it is easier to maintain part alignment and to insure that each face plate is properly associated with the appropriate tower body and, assuming a double-sided tower body, that each face plate 101 is properly associated with the appropriate side of a specific tower body 103. Additionally, if the planting and/or harvesting operations are performed with the face plate 101 in the open position, for the dual-sided configuration both face plates can be opened and simultaneously planted and/or harvested, thus eliminating the step of planting and/or harvesting one side and then rotating the tower and planting and/or harvesting the other side. In other embodiments, planting and/or harvesting operations are performed with the face plate 101 in the closed position.

Other implementations are possible. For example, grow tower 50 can comprise any tower body that includes a volume of medium or wicking medium extending into the tower interior from the face of the tower (either a portion or individual portions of the tower or the entirety of the tower length. For example, U.S. Pat. No. 8,327,582, which is incorporated by reference herein, discloses a grow tube having a slot extending from a face of the tube and a grow medium contained in the tube. The tube illustrated therein may be modified to include a hook 52 at the top thereof and to have slots on opposing faces, or one slot on a single face.

Vertical Tower Conveyance System

Figure 5A:
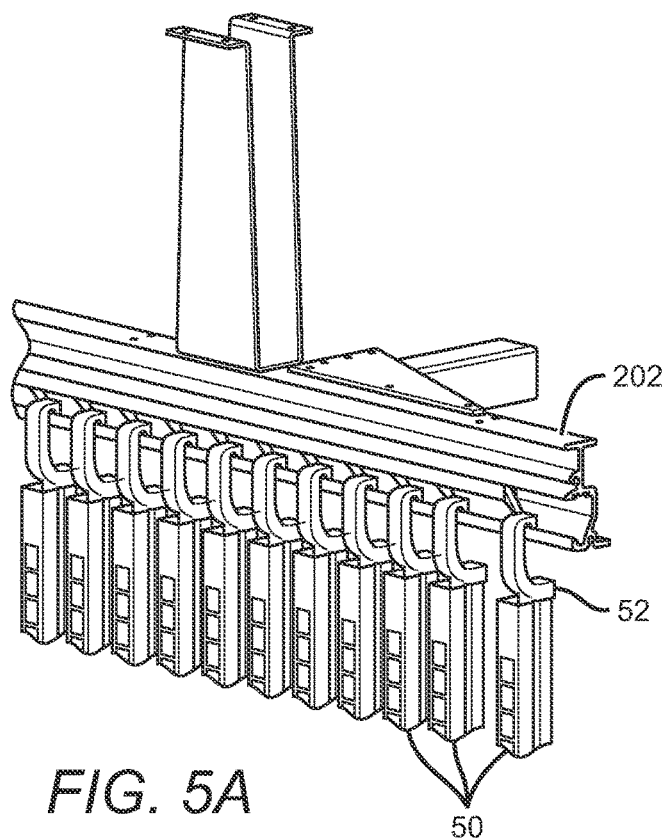
FIG. 5A is a perspective view of a portion of an example grow line.
Figure 5B:
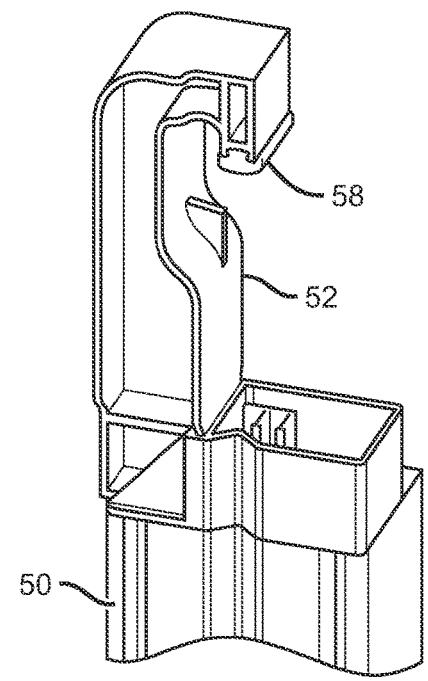
FIG. 5B is a perspective view of an example tower hook.

FIG. 5A illustrates a portion of a grow line 202 in vertical tower conveyance system 200. In one implementation, the vertical tower conveyance system 200 includes a plurality of grow lines 202 arranged in parallel. As discussed above, automated loading and unloading mechanisms 45, 47 may selectively load and unload grow towers 50 from a grow line 202 under automated control systems. As FIG. 5A shows, each grow line 202 supports a plurality of grow towers 50. In one implementation, a grow line 202 may be mounted to the ceiling (or other support) of the grow structure by a bracket for support purposes. Hook 52 hooks into, and attaches, a grow tower 50 to a grow line 202, thereby supporting the tower in a vertical orientation as it is translated through the vertical tower conveyance system 200. A conveyance mechanism moves towers 50 attached to respective grow lines 202.

Figure 10:
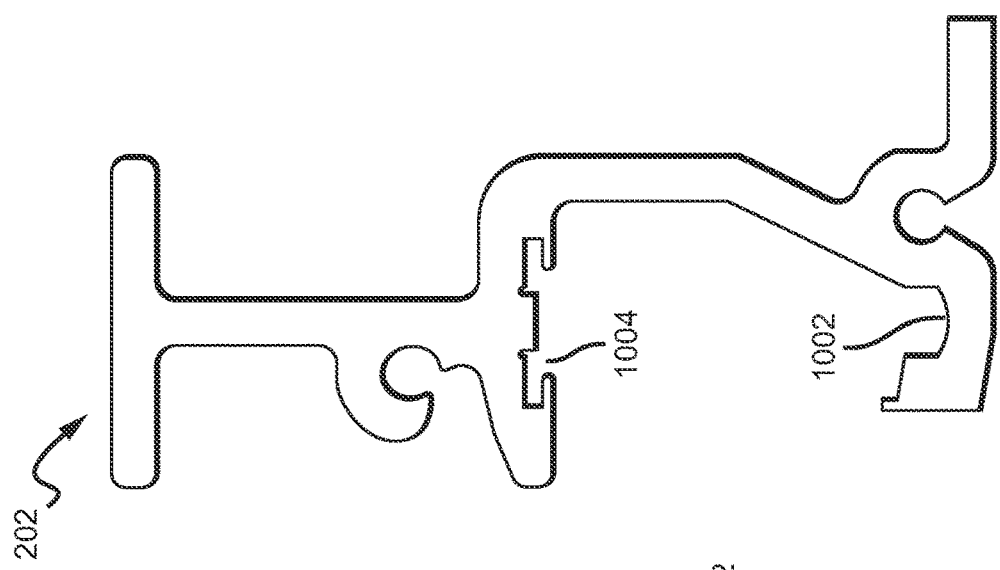
FIG. 10 is a profile view of an example grow line.
Figure 9:
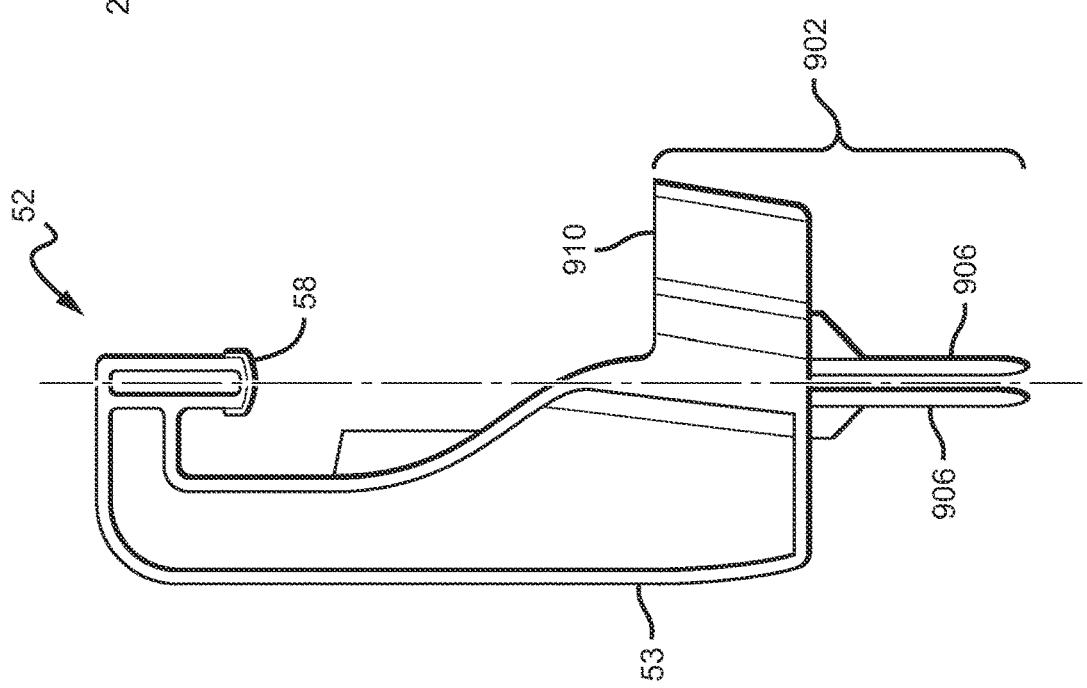
FIG. 9 is a side view of an example tower hook and integrated funnel structure.

FIG. 10 illustrates the cross section or extrusion profile of a grow line 202, according to one possible implementation of the invention. The grow line 202 may be an aluminum extrusion. The bottom section of the extrusion profile of the grow line 202 includes an upward facing groove 1002. As FIG. 9 shows, hook 52 of a grow tower 50 includes a main body 53 and corresponding member 58 that engages groove 1002 as shown in FIGS. 5A and 8. These hooks allow the grow towers 50 to hook into the groove 1002 and slide along the grow line 202 as discussed below. Conversely, grow towers 50 can be manually unhooked from a grow line 202 and removed from production. This ability may be necessary if a crop in a grow tower 50 becomes diseased so that it does not infect other towers. In one possible implementation, the width of groove 1002 (for example, 13 mm) is an optimization between two different factors. First, the narrower the groove the more favorable the binding rate and the less likely grow tower hooks 52 are to bind. Conversely, the wider the groove the slower the grow tower hooks wear due to having a greater contact patch. Similarly, the depth of the groove, for example 10 mm, may be an optimization between space savings and accidental fallout of tower hooks.

Hooks 52 may be injection-molded plastic parts. In one implementation, the plastic may be polyvinyl chloride (PVC), acrylonitrile butadiene styrene (ABS), or an Acetyl Homopolymer (e.g., Delrin® sold by DuPont Company). The hook 52 may be solvent bonded to the top of the grow tower 50 and/or attached using rivets or other mechanical fasteners. The groove-engaging member 58 which rides in the rectangular groove 1002 of the grow line 202 may be a separate part or integrally formed with hook 52. If separate, this part can be made from a different material with lower friction and better wear properties than the rest of the hook, such as ultra-high-molecular weight polyethylene or acetal. To keep assembly costs low, this separate part may snap onto the main body of the hook 52. Alternatively, the separate part also be over-molded onto the main body of hook 52.

Figure 6:
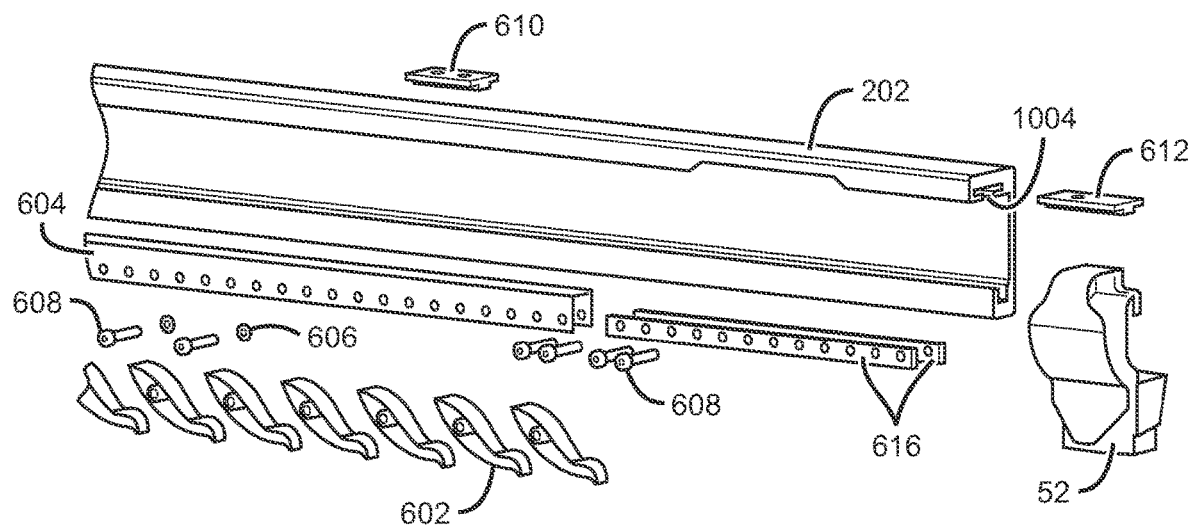
FIG. 6 is an exploded, perspective view of a portion of an example grow line and reciprocating cam mechanism.

As FIGS. 6 and 10 illustrate, the top section of the extrusion profile of grow line 202 contains a downward facing t-slot 1004. Linear guide carriages 610 (described below) ride within the t-slot 1004. The center portion of the t-slot 1004 may be recessed to provide clearance from screws or over-molded inserts which may protrude from the carriages 610. Each grow line 202 can be assembled from a number of separately fabricated sections. In one implementation, sections of grow line 202 are currently modeled in 6-meter lengths. Longer sections reduce the number of junctions but are more susceptible to thermal expansion issues and may significantly increase shipping costs. Additional features not captured by the Figures include intermittent mounting holes to attach the grow line 202 to the ceiling structure and to attach irrigation lines. Interruptions to the t-slot 1004 may also be machined into the conveyor body. These interruptions allow the linear guide carriages 610 to be removed without having to slide them all the way out the end of a grow line 202.

At the junction between two sections of a grow line 202, a block 612 may be located in the t-slots 1004 of both conveyor bodies. This block serves to align the two grow line sections so that grow towers 50 may slide smoothly between them. Alternative methods for aligning sections of a grow line 202 include the use of dowel pins that fit into dowel holes in the extrusion profile of the section. The block 612 may be clamped to one of the grow line sections via a set screw, so that the grow line sections can still come together and move apart as the result of thermal expansion. Based on the relatively tight tolerances and small amount of material required, these blocks may be machined. Bronze may be used as the material for such blocks due to its strength, corrosion resistance, and wear properties.

In one implementation, the vertical tower conveyance system 200 utilizes a reciprocating linear ratchet and pawl structure (hereinafter referred to as a "reciprocating cam structure or mechanism") to move grow towers 50 along a grow line 202. FIGS. 5A, 6 and 7 illustrate one possible reciprocating cam mechanism that can be used to move grow towers 50 across grow lines 202. Pawls or "cams" 602 physically push grow towers 50 along grow line 202. Cams 602 are attached to cam channel 604 (see below) and rotate about one axis. On the forward stroke, the rotation is limited by the top of the cam channel 604, causing the cams 602 to push grow towers 50 forward. On the reserve or back stroke, the rotation is unconstrained, thereby allowing the cams to ratchet over the top of the grow towers 50. In this way, the cam mechanism can stroke a relatively short distance back and forth, yet grow towers 50 always progress forward along the entire length of a grow line 202. A control system, in one implementation, controls the operation of the reciprocating cam mechanism of each grow line 202 to move the grow towers 50 according to a programmed growing sequence. In between movement cycles, the actuator and reciprocating cam mechanism remain idle.

The pivot point of the cams 602 and the means of attachment to the cam channel 604 consists of a binding post 606 and a hex head bolt 608; alternatively, detent clevis pins may be used. The hex head bolt 608 is positioned on the inner side of the cam channel 604 where there is no tool access in the axial direction. Being a hex head, it can be accessed radially with a wrench for removal. Given the large number of cams needed for a full-scale farm, a high-volume manufacturing process such as injection molding is suitable. ABS is suitable material given its stiffness and relatively low cost. All the cams 602 for a corresponding grow line 202 are attached to the cam channel 604. When connected to an actuator, this common beam structure allows all cams 602 to stroke back and forth in unison. The structure of the cam channel 604, in one implementation, is a downward facing u-channel constructed from sheet metal. Holes in the downward facing walls of cam channel 604 provide mounting points for cams 602 using binding posts 606.

Holes of the cam channel 604, in one implementation, are spaced at 12.7 mm intervals. Therefore, cams 602 can be spaced relative to one another at any integer multiple of 12.7 mm, allowing for variable grow tower spacing with only one cam channel. The base of the cam channel 604 limits rotation of the cams during the forward stroke. All degrees of freedom of the cam channel 604, except for translation in the axial direction, are constrained by linear guide carriages 610 (described below) which mount to the base of the cam channel 604 and ride in the t-slot 1004 of the grow line 202. Cam channel 604 may be assembled from separately formed sections, such as sections in 6-meter lengths. Longer sections reduce the number of junctions but may significantly increase shipping costs. Thermal expansion is generally not a concern because the cam channel is only fixed at the end connected to the actuator. Given the simple profile, thin wall thickness, and long length needed, sheet metal rolling is a suitable manufacturing process for the cam channel. Galvanized steel is a suitable material for this application.

Linear guide carriages 610 are bolted to the base of the cam channels 604 and ride within the t-slots 1004 of the grow lines 202. In some implementations, one carriage 610 is used per 6-meter section of cam channel. Carriages 610 may be injection molded plastic for low friction and wear resistance. Bolts attach the carriages 610 to the cam channel 604 by threading into over molded threaded inserts. If select cams 602 are removed, these bolts are accessible so that a section of cam channel 604 can be detached from the carriage and removed.

Sections of cam channel 604 are joined together with pairs of connectors 616 at each joint; alternatively, detent clevis pins may be used. Connectors 616 may be galvanized steel bars with machined holes at 20 mm spacing (the same hole spacing as the cam channel 604). Shoulder bolts 618 pass through holes in the outer connector, through the cam channel 604, and thread into holes in the inner connector. If the shoulder bolts fall in the same position as a cam 602, they can be used in place of a binding post. The heads of the shoulder bolts 618 are accessible so that connectors and sections of cam channel can be removed.

In one implementation, cam channel 604 attaches to a linear actuator, which operates in a forward and a back stroke. A suitable linear actuator may be the T13-B4010MS053-62 actuator offered by Thomson, Inc. of Redford, Virginia; however, the reciprocating cam mechanism described herein can be operated with a variety of different actuators. The linear actuator may be attached to cam channel 604 at the off-loading end of a grow line 202, rather than the on-boarding end. In such a configuration, cam channel 604 is under tension when loaded by the towers 50 during a forward stroke of the actuator (which pulls the cam channel 604) which reduces risks of buckling. FIG. 7A illustrates operation of the reciprocating cam mechanism according to one implementation of the invention. In step A, the linear actuator has completed a full back stroke; as FIG. 7A illustrates, one or more cams 602 may ratchet over the hooks 52 of a grow tower 50. Step B of FIG. 7A illustrates the position of cam channel 604 and cams 602 at the end of a forward stroke. During the forward stroke, cams 602 engage corresponding grow towers 50 and move them in the forward direction along grow line 202 as shown. Step C of FIG. 7A illustrates how a new grow tower 50 (Tower 0) may be inserted onto a grow line 202 and how the last tower (Tower 9) may be removed. Step D illustrates how cams 602 ratchet over the grow towers 50 during a back stroke, in the same manner as Step A. The basic principle of this reciprocating cam mechanism is that reciprocating motion from a relatively short stroke of the actuator transports towers 50 in one direction along the entire length of the grow line 202. More specifically, on the forward stroke, all grow towers 50 on a grow line 202 are pushed forward one position. On the back stroke, the cams 602 ratchet over an adjacent tower one position back; the grow towers remain in the same location. As shown, when a grow line 202 is full, a new grow tower may be loaded and a last tower unloaded after each forward stroke of the linear actuator. In some implementations, the top portion of the hook 52 (the portion on which the cams push), is slightly narrower than the width of a grow tower 50. As a result, cams 602 can still engage with the hooks 52 when grow towers 50 are spaced immediately adjacent to each other. FIG. 7A shows 9 grow towers for didactic purposes. A grow line 202 can be configured to be quite long (for example, 40 meters) allowing for a much greater number of towers 50 on a grow line 202 (such as 400-450). Other implementations are possible. For example, the minimum tower spacing can be set equal to or slightly greater than two times the side-to-side distance of a grow tower 50 to allow more than one grow tower 50 to be loaded onto a grow line 202 in each cycle.

Figure 7B:
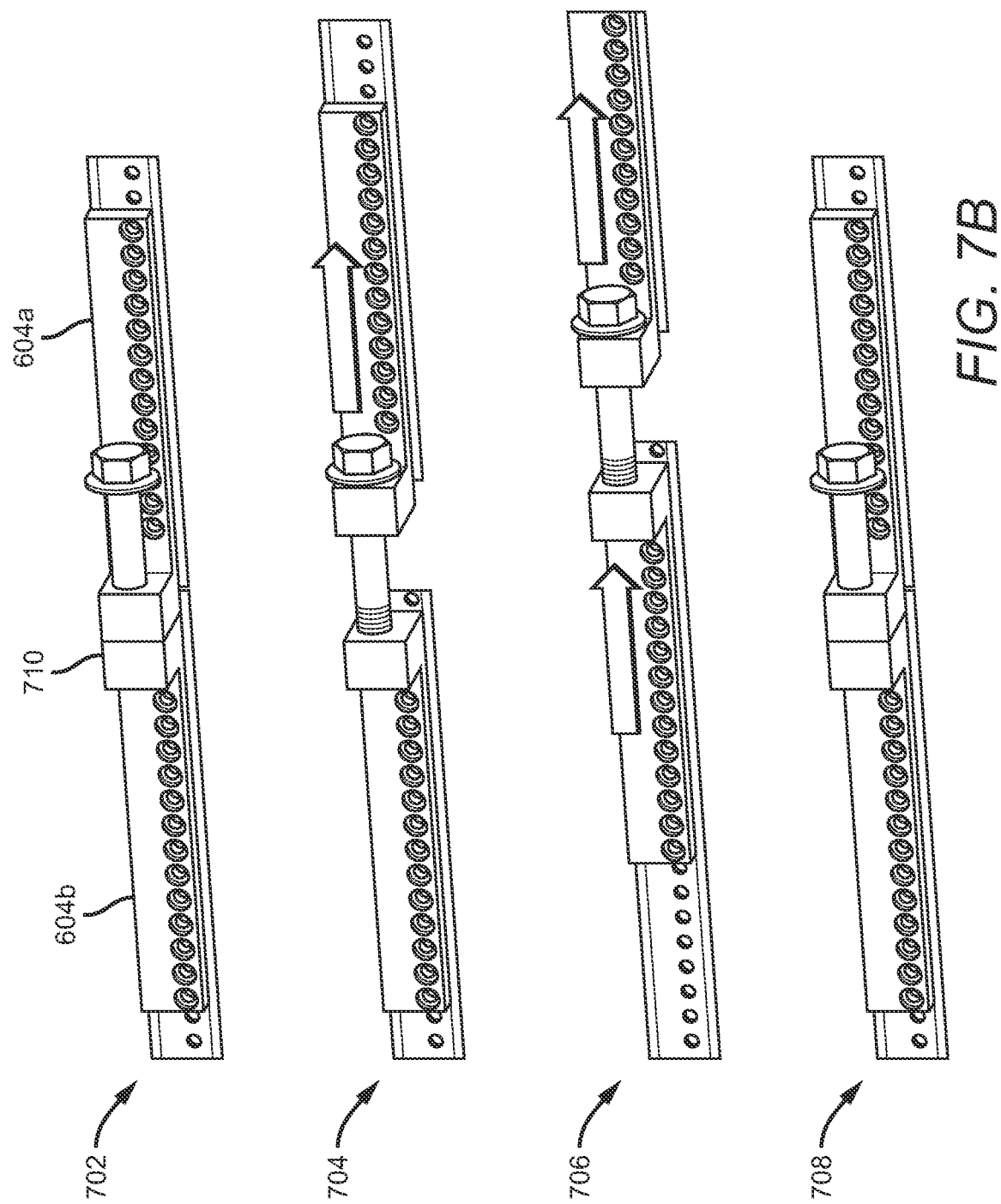
FIG. 7B illustrates an alternative cam channel including an expansion joint.

Still further, as shown in FIG. 7A, the spacing of cams 602 along the cam channel 604 can be arranged to effect one-dimensional plant indexing along the grow line 202. In other words, the cams 602 of the reciprocating cam mechanism can be configured such that spacing between towers 50 increases as they travel along a grow line 202. For example, spacing between cams 602 may gradually increase from a minimum spacing at the beginning of a grow line to a maximum spacing at the end of the grow line 202. This may be useful for spacing plants apart as they grow to increase light interception and provide spacing, and, through variable spacing or indexing, increasing efficient usage of the growth chamber 20 and associated components, such as lighting. In one implementation, the forward and back stroke distance of the linear actuator is equal to (or slightly greater than) the maximum tower spacing. During the back stroke of the linear actuator, cams 602 at the beginning of a grow line 202 may ratchet and overshoot a grow tower 50. On the forward stroke, such cams 602 may travel respective distances before engaging a tower, whereas cams located further along the grow line 202 may travel shorter distances before engaging a tower or engage substantially immediately. In such an arrangement, the maximum tower spacing cannot be two times greater than the minimum tower spacing; otherwise, a cam 602 may ratchet over and engage two or more grow towers 50. If greater maximum tower spacing is desired, an expansion joint may be used, as illustrated in FIG. 7B. An expansion joint allows the leading section of the cam channel 604 to begin traveling before the trailing end of the cam channel 604, thereby achieving a long stroke. In particular, as FIG. 7B shows, expansion joint 710 may attach to sections 604a and 604b of cam channel 604. In the initial position (702), the expansion joint 710 is collapsed. At the beginning of a forward stroke (704), the leading section 604a of cam channel 604 moves forward (as the actuator pulls on cam channel 604), while the trailing section 604b remains stationary. Once the bolt bottoms out on the expansion joint 710 to an open position (706), the trailing section 604 of cam channel 604 begins to move forward as well. On the back stroke (708), the expansion joint 710 collapses to its initial position. During the back stroke, the leading section 604a moves backward, while the trailing section remains stationary, until the expansion joint reaches the initial, collapsed position.

Other configurations for grow line 202 are possible. For example, although the grow line 202 illustrated in the various figures is horizontal to the ground, the grow line 202 may be sloped at a slight angle, either downwardly or upwardly relative to the direction of tower travel. Still further, while the grow line 202 described above operates to convey grow towers in a single direction, the grow line 202 may be configured to include multiple sections, where each section is oriented in a different direction. For example, two sections may be perpendicular to each other. In other implementations, two sections may run parallel to each other, but have opposite directions of travel, to form a substantially u-shaped travel path. In such an implementation, a return mechanism can transfer grow towers from the end of the first path section to the onload end of the second path section of the grow line.

Irrigation & Aqueous Nutrient Supply

FIG. 8 illustrates how an irrigation line 802 may be attached to grow line 202 to supply an aqueous nutrient solution to crops disposed in grow towers 50 as they translate through the vertical tower conveyance system 200. Irrigation line 802, in one implementation, is a pressurized line with spaced-apart openings or holes disposed at the expected locations of the towers 50 (tower load positions) as they advance along grow line 202 with each movement cycle. For example, the irrigation line 802 may be a PVC pipe having an inner diameter of 1.5 inches and holes having diameters of 0.125 inches. The irrigation line 802 may be approximately 40 meters in length spanning the entire length of a grow line 202. To ensure adequate pressure across the entire line, irrigation line 802 may be broken into shorter sections, each connected to a manifold, so that pressure drop is reduced. The apertures or holes may be fitted with emitter structures, such as a nozzle or tube extending downwardly from the irrigation line 802.

Figure 11A:
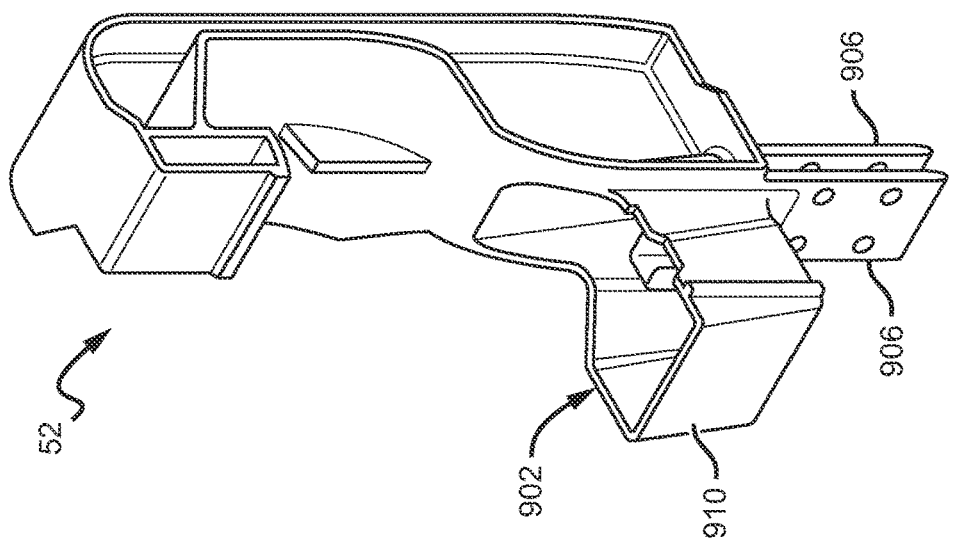
FIG. 11A is perspective view of an example tower hook and integrated funnel structure.

As FIG. 8 shows, a funnel structure 902 collects aqueous nutrient solution from irrigation line 802 and distributes the aqueous nutrient solution to the cavity(ies) 54a, 54b of the grow tower 50 as discussed in more detail below. FIGS. 9 and 11A illustrate that the funnel structure 902 may be integrated into hook 52. For example, the funnel structure 902 may include a collector 910, first and second passageways 912 and first and second slots 920. As FIG. 9 illustrates, the groove-engaging member 58 of the hook may disposed at a centerline of the overall hook structure. The funnel structure 902 may include flange sections 906 extending downwardly opposite the collector 910 and on opposing sides of the centerline. The outlets of the first and second passageways are oriented substantially adjacent to and at opposing sides of the flange sections 906, as shown. Flange sections 906 register with central wall 56 of grow tower 50 to center the hook 52 and provides additional sites to adhere or otherwise attach hook 52 to grow tower 50. In other words, when hook 52 is inserted into the top of grow tower 50, central wall 56 is disposed between flange sections 906. In the implementation shown, collector 910 extends laterally from the main body 53 of hook 52.

Figure 11B:
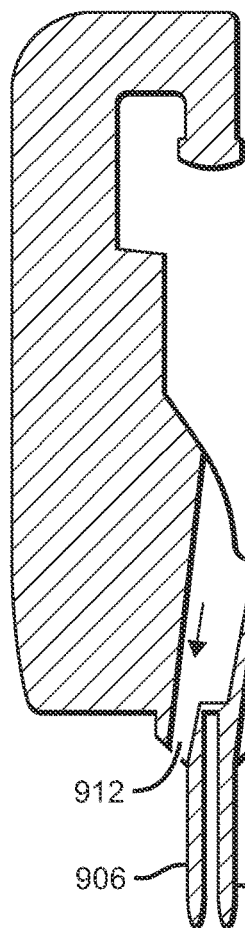
FIG. 11B is a section view of an example tower hook and integrated funnel structure.
Figure 11C:
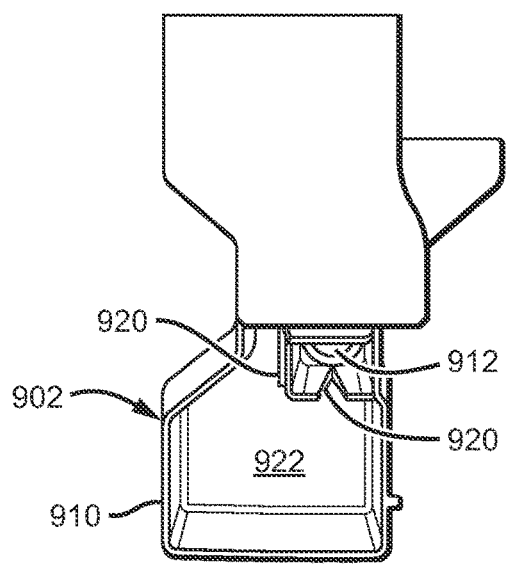
FIG. 11C is a top view of an example tower hook and integrated funnel structure.

As FIG. 11B shows, funnel structure 902 includes a collector 910 that collects nutrient fluid and distributes the fluid evenly to the inner cavities 54a and 54b of tower through passageways 912. Passageways 912 are configured to distribute aqueous nutrient solution near the central wall 56 and to the center back of each cavity 54a, 54b over the ends of the plug holders 158 and where the roots of a planted crop are expected. As FIG. 11C illustrates, in one implementation, the funnel structure 902 includes slots 920 that promote the even distribution of nutrient fluid to both passageways 912. For nutrient fluid to reach passageways 912, it must flow through one of the slots 920. Each slot 920 may have a V-like configuration where the width of the slot opening increases as it extends from the substantially flat bottom surface 922 of collector 910. For example, each slot 920 may have a width of 1 millimeter at the bottom surface 922. The width of slot 920 may increase to 5 millimeters over a height of 25 millimeters. The configuration of the slots 920 causes nutrient fluid supplied at a sufficient flow rate by irrigation line 802 to accumulate in collector 910, as opposed to flowing directly to a particular passageway 912, and flow through slots 920 to promote even distribution of nutrient fluid to both passageways 912.

In operation, irrigation line 802 provides aqueous nutrient solution to funnel structure 902 that even distributes the water to respective cavities 54a, 54b of grow tower 50. The aqueous nutrient solution supplied from the funnel structure 902 irrigates crops contained in respective plug containers 158 as it trickles down. In one implementation, a gutter disposed under each grow line 202 collects excess water from the grow towers 50 for recycling.

Other implementations are possible. For example, the funnel structure may be configured with two separate collectors that operate separately to distribute aqueous nutrient solution to a corresponding cavity 54a, 54b of a grow tower 50. In such a configuration, the irrigation supply line can be configured with one hole or aperture for each collector. In some implementations, an emitter structure or nozzle may be attached to each hole or aperture. In other implementations, the towers may only include a single cavity and include plug containers only on a single face 101 of the towers. Such a configuration still calls for a use of a funnel structure that directs aqueous nutrient solution to a desired portion of the tower cavity, but obviates the need for separate collectors or other structures facilitating even distribution.

Tower Shuttle Mechanism

In the implementation described above in connection with FIG. 7A, when a grow line 202 is full, a new grow tower 50 may be loaded and a last grow tower unloaded after each forward stroke of the linear actuator associated with the reciprocating cam mechanism. If the reciprocating cam mechanism cycles without loading a grow tower 50 at each cycle, a gap will be created preventing full utilization of the length of the grow line 202. For certain operational purposes, it may be desirable to de-couple tower unloading and loading operations. In other words, it may be desirable to cycle the reciprocating cam mechanism a number of times to extract grow towers without injecting a new grow tower at each cycle.

For example, grow lines 202 can be quite long and thereby support a large number of grow tower positions (such as 100-200 grow positions). In addition, a daily harvest may involve the extraction of 30-40 grow towers 50 in a single batch process. It may be desirable to have operating staff concentrate on offloading towers for harvesting in a daily or batch process and then concentrate on injecting new towers into vertical farming structure in a separate daily or batch process.

Figure 13:
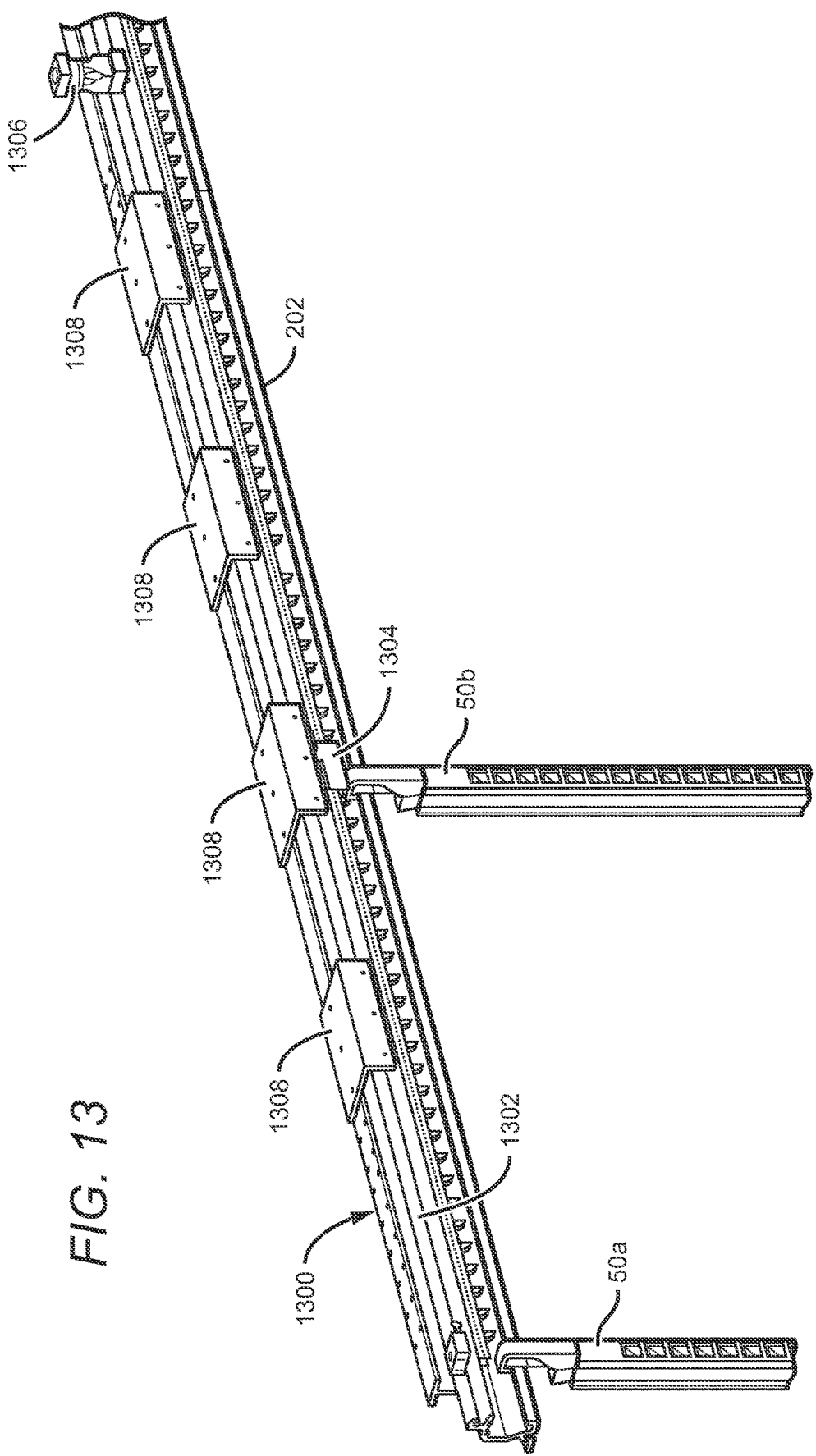
FIG. 13 is a perspective view of a grow line and an example tower shuttle mechanism.

FIG. 13 illustrates an example tower shuttle mechanism 1300 that allows for injection of grow towers 50 at select positions along a grow line 202 without cycling of the reciprocating cam mechanism. The tower shuttle mechanism 1300 allows a system operator to cycle the reciprocating cam mechanism multiple times (e.g., 30-40 times) to extract towers 50 for harvesting without having to insert a new grow tower 50 at each cycle and, in a later process, insert new grow towers 50 using tower shuttle mechanism 1300.

Tower shuttle mechanism 1300 comprises a track 1302, carriage assembly 1304 and a servomotor 1306. Brackets 1308 mount track 1302 to an associated grow line 202 and in a substantially parallel orientation to the grow line 202. In the implementation shown, track 1302 extends from the onload (beginning) end of grow line 202 and extends along a desired length thereof. For example, the length of track 1302 may extend along 30 to 40 grow tower positions along grow line 202. A control system causes servomotor 1306 to drive carriage assembly 1304 to select load positions along the track 1302. In some implementations, the control system can be programmed to perform a tower loading process for a predetermined set of grow towers 50 (e.g., 35 grow towers) to be inserted onto grow line 202 after a batch extraction process of a set of grow towers to be harvested.

Figure 14:
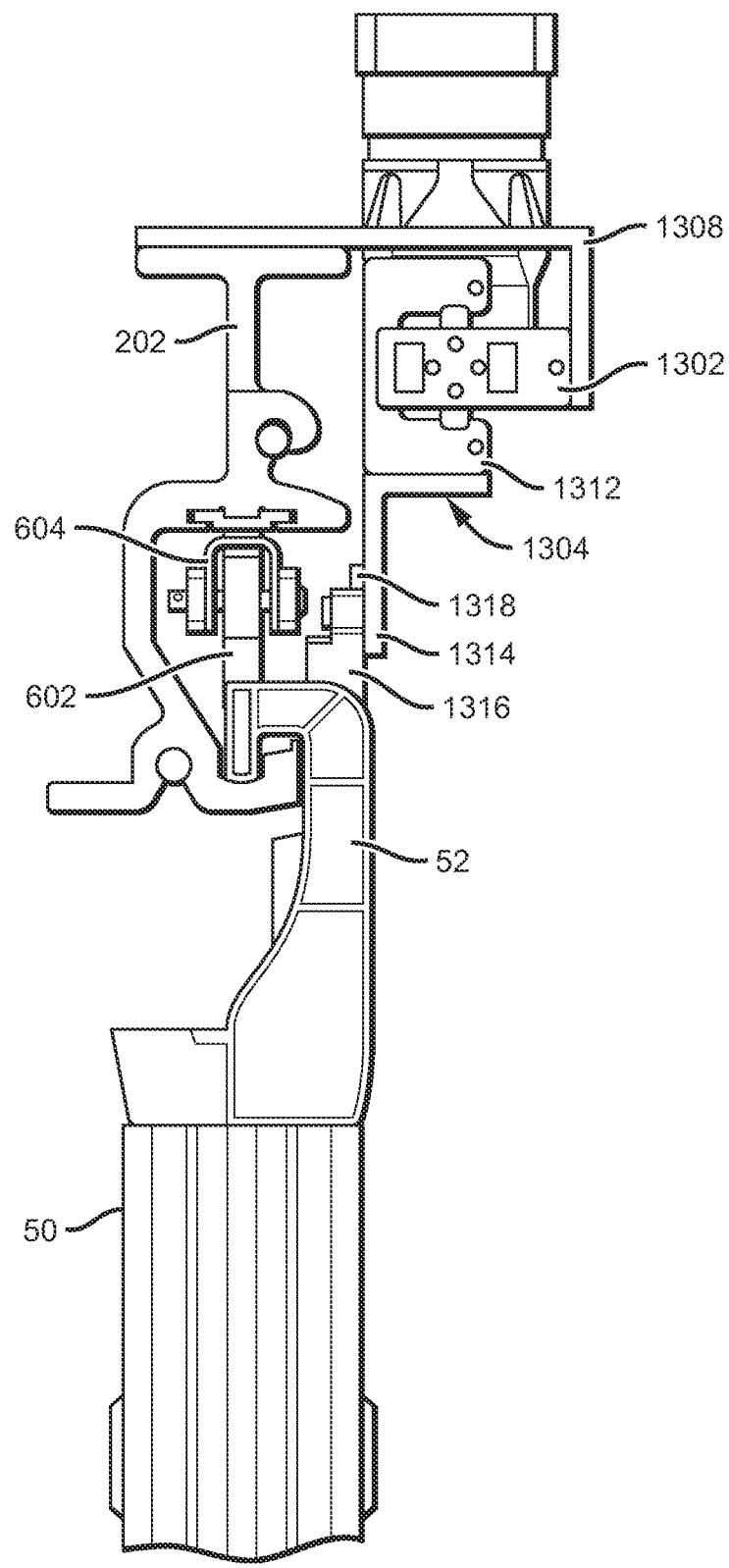
FIG. 14 is an elevation view of an example tower shuttle mechanism.

FIG. 14 is an elevation view showing the end of a grow line 202 and how bracket 1308 attaches track 1302 adjacent to the grow line 202. FIGS. 15A and 15B show an example carriage assembly 1304. For example, carriage assembly 1304 may comprise a carriage base 1312 that moves along track 1302 in response to controlled actuation of servomotor 1306. Bracket 1314 attaches to carriage base 1312 as shown and includes pawl member 1316 pivotally attached to bracket 1314. Stop 1318 prevents pawl 1316 from rotating when it engages a grow tower moving in the forward direction (to the left relative to FIG. 15B). Pawl 1316, however, ratchets over a hook 52 of a grow tower 50 when moving in the reverse direction. As FIG. 14 illustrates, the path of pawl 1316 is adjacent to cams 602 of the reciprocating cam mechanism that indexes the grow towers 50 along grow line 202. Whereas cams 602 engage over the center of hook 52, pawl 1316 engages hook 52 at a lateral portion closer to the outer edge. In one implementation, track 1302 and carriage base 1312 can be a belt-driven actuator. The MSA series of actuators offered by Macron Dynamics, Inc. of Croydon, PA are examples of belt-driven actuators suitable for use in various implementations disclosed herein.

FIG. 13 illustrates a first grow tower 50a at a load position (p0). As discussed above, a linear actuator may push a new grow tower 50 from load transfer conveyance mechanism 47 onto a select grow line 202 at the load position (p0). Tower shuttle mechanism 1300 can be controlled to move pawl 1316 back over hook 52 of grow tower 50a and then forward to a desired tower position (p1, p2, etc.) along grow line 202. In one implementation, a control system causes tower shuttle mechanism 1300 to move grow tower 50a to the furthest open position along grow line 202. As the grow tower 50a is pushed along grow line 202, cams 602 ratchet upward to allow grow tower 50a to pass. If the reciprocating cam mechanism has been cycled to off load 35 grow towers from the end of grow line 202, the tower shuttle mechanism 1300 will push grow tower 50a to the $35^{th}$ grow tower position (p35) along grow line 202. A control system can be programmed to repeat this process for the remaining 34 grow towers in a loading cycle with each target load position being decremented as a grow tower is loaded into the desired load position.

As discussed above, each grow tower load position (except for load position p0) includes an aperture or emitter where the irrigation system supplies solution to the funnel structure of hook 52. Ideally, when at a given tower position, each grow tower 50 is positioned such that the funnel structure is centered under the corresponding aperture or emitter. In one implementation, tower shuttle mechanism 1300 is configured to place a grow tower 50 at this ideal location for a given grow tower position. It has been found, however, that tower shuttle mechanism 1300 may cause grow towers 50 to slide past this ideal location. To account for this possibility, tower shuttle mechanism 1300 can be configured to place each grow tower a programmed distance (for example, 0.5 inches) short of the center or ideal position for each tower position. In this position, the hook 52 of a grow tower 50 has not ratcheted completely under a cam 602 corresponding to a given load position. After all tower positions have been filled, the reciprocating cam mechanism can be controlled to perform a so-called datum sequence to position the newly loaded grow towers 50 at the respective desired locations. The datum sequence does not involve a full stroke of the reciprocating cam mechanism. The datum sequence stroke is sufficient for cams 602 corresponding to the load positions (p1-p35, for example) to ratchet over the newly loaded grow towers during the back stroke. However, the datum sequence back stroke is not long enough to cause cams 602 for subsequent load positions (e.g., load position p36, etc.) to ratchet over (and, therefore, engage) a grow tower 50 from a prior load position (e.g., load position p35). During the forward stroke, the reciprocating cam mechanism pushes the newly loaded towers 50 forward to their respective centered or ideal positions along grow line 202. The cams 602 associated with already loaded grow towers 50 (e.g., load positions p36 et seq. in this didactic example) move away from the respective grow towers 50 during this shorter back stroke and then toward the grow towers 50 during the forward stroke of the datum sequence without substantially moving them.

Other implementations are possible. For example, tower shuttle mechanism 1300 can be configured to engage a grow tower 50 directly from a carriage 1202 of load transfer conveyance mechanism 47 and place it on grow line 202. In one implementation, load transfer conveyance mechanism 47 positions carriage 1202 such that a 1-3 millimeter gap exists between receiver 1204 and the end of a select grow line 202. Pawl 1316 pulls hook 52 over this gap from receiver 1204 onto grow line 202.

Figure 16:
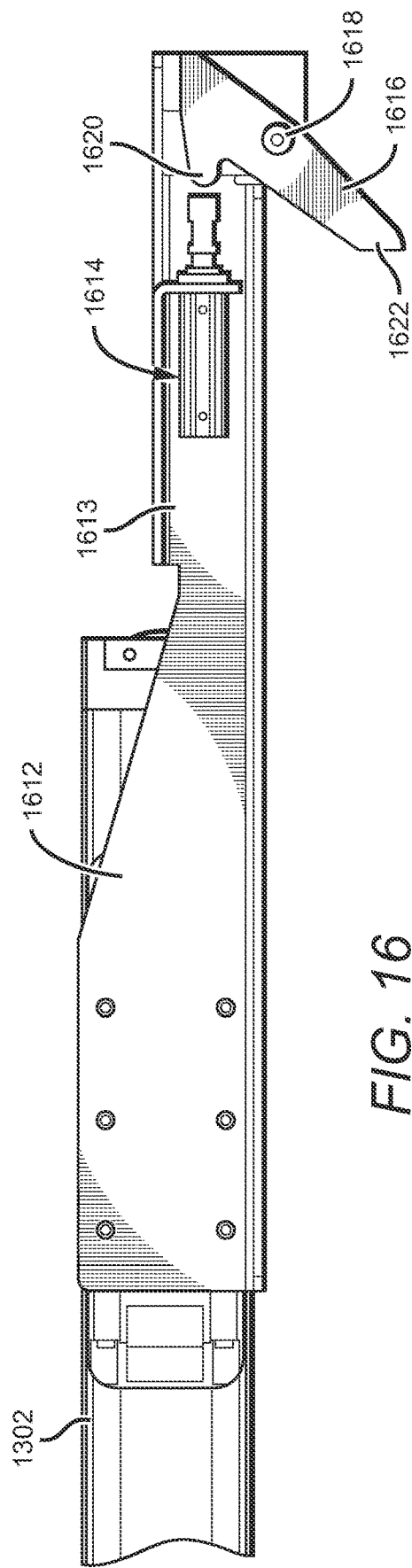
FIG. 16 is a side elevation view of an alternative tower shuttle mechanism.

In addition, pawl 1316 can be replaced by an actuated pawl or other structure that selectively retracts (to slide past the back end of hook 52 in the reverse direction) and extends to engage a grow tower 50 to slide it along grow line 202, as carriage assembly 1304 is moved along track 1302. For example, FIG. 16 illustrates an alternative implementation having an actuated pawl 1616. Carriage base 1612 is slidably mounted to track 1302 and is actuated as discussed above. Pawl 1616 is rotatably attached to carriage arm 1613 by pin 1618. As FIG. 16 shows, an actuator 1614 mounted to carriage base 1612 can be selectively controlled to push against member 1620 of pawl 1616, causing the end 1622 of pawl 1616 to rotate upwardly. Displacement of pawl 1616 in this manner allows the shuttle mechanism to move past grow towers 50 already placed in the grow line 202. When pawl is moving in the forward direction and engaging a grow tower 50, member 1620 abuts against the end of actuator 1614 to hold pawl 1616 in position. The actuator 1614 can be selectively actuated to move the pawl 1616 over a grow tower 50 in a loading position, and then retracted to move the pawl 1616 into an engagement position relative to that grow tower 50 before a loading operation. Actuation of pawl 1616 also allows the shuttle to inspect (such as determining their position on grow line 202 or measuring some other attribute of interest) the grow towers 50 without disturbing their positions and allows shuttle mechanism to be used to adjust the position of grow towers 50 already positioned in a grow line 202.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

All references, articles, publications, patents, patent publications, and patent applications cited herein are incorporated by reference in their entireties for all purposes to the extent they are not inconsistent with embodiments of the disclosure expressly described herein. However, mention of any reference, article, publication, patent, patent publication, and patent application cited herein is not, and should not be taken as an acknowledgment or any form of suggestion that they constitute valid prior art or form part of the common general knowledge in any country in the world, or that they are disclose essential matter.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A crop production system for controlled environment agriculture, comprising:
   one or more grow lines, each of the one or more grow lines comprising a grow conveyance mechanism and a tower shuttle system; and
   a plurality of grow towers, each of the plurality of grow towers vertically attached to, and moveable along, a respective one of the one or more grow lines;
   wherein each grow conveyance mechanism comprises:
   a common beam disposed in a track, the track extending in a direction parallel to the grow line;
   an actuator attached to the common beam, wherein the actuator is operative to move the common beam along the track in a forward stroke and a back stroke; and
   a plurality of cam members pivotally attached at select positions along the common beam, wherein each cam member is mounted to limit rotation of the cam member during the forward stroke causing the cam member to engage and push a first grow tower forward in a first direction during the forward stroke and to allow the cam member to slide over a second grow tower during the back stroke; wherein the select positions of the plurality of cam members are each configured such that in a forward stroke a respective cam member engages a first grow tower during the forward stroke and ratchets over a second grow tower adjacent to the first tower during the back stroke; and wherein each tower shuttle system comprises
- a track mounted proximal to and extending parallel to the grow line;
- a carriage attached to the track;
- an actuator configured to cause the carriage to slide along the track; and
- an engagement member attached to the carriage and configured to releasably engage a grow tower; and
- a control system operative to cause the engagement member to engage the grow tower at a load position and cause the carriage to slide the grow tower to a select position along the grow line.

2. The crop production system of claim 1 wherein the engagement member comprises
a pawl pivotally attached to the carriage, wherein when traveling in a forward direction, the pawl engages a grow tower and slides the grow tower along the grow line and, when traveling in a backward direction, the pawl ratchets over a second grow tower located in a loading position.

3. The crop production system of claim 1 wherein the engagement member comprises
a pawl pivotally attached to the carriage, and a pawl actuator operative to engage the pawl, wherein the pawl is configured such that, when traveling in a forward direction, the pawl engages a grow tower and slides the grow tower along the grow line and, when traveling in a backward direction, the pawl actuator moves the pawl upwardly to allow the pawl to move over a second grow tower located in a loading position.

4. The crop production system of claim 1 wherein the spacing of the select positions increases in the first direction such that spacing of the grow towers increases as such towers are pushed along the one or more grow lines with successive cycles of the actuator.

5. The crop production system of claim 1 wherein the common beam has a u-shaped profile having first and second walls extending from a base, and wherein the plurality of cam members are each mounted at the select positions along the first and second walls.

6. The crop production system of claim 5 wherein the common beam comprises a first beam section, a second beam section, and an expansion joint attached to opposing ends of the first and second beam sections, wherein the expansion joint is movable from a collapsed position to an open position and configured such that, during the forward stroke, the expansion joint moves from the collapsed position to the open position thereby causing the first beam section to move forward while the second beam section remains stationary until the expansion joint is in the open position and, during the back stroke, the expansion joint moves from the open position to the collapsed position.

7. The crop production system of claim 1 wherein each of the plurality of grow towers comprises a hook attached to the top of the grow tower, wherein the hook is configured to engage the grow line.

8. The crop production system of claim 7 wherein each of the one or more grow lines includes a groove region to which the hook of a grow tower slidably attaches.

9. The crop production system of claim 1 wherein each of the plurality of grow towers comprises a first plurality of plug containers arranged along a first face of the grow tower.

10. The crop production system of claim 9 wherein each of the plurality of grow towers comprises a second plurality of plug containers arranged along a second face of the grow tower, wherein the second face is opposite to the first face.

11. The crop production system of claim 1 further comprising an onloading mechanism comprising a power and free conveyer and one or more carriages; wherein the one or more carriages are configured to releasably engage grow towers; and wherein the power and free conveyer is configured to insert a grow towers on a selected grow line of the one or more grow lines.

12. The crop production system of claim 1 further comprising an irrigation system operative to supply a fluid to respective tops ends of the plurality of grow towers at one or more of the select positions along the grow line; and wherein each of the plurality of grow towers comprises a tower body and a funnel disposed on the top of the tower body, the funnel configured to direct fluid flowing therethrough over a desired region within the tower body.

13. The crop production system of claim 12 wherein the irrigation system comprises one or more irrigation lines including openings located proximally over the select positions.

14. The crop production system of claim 12 wherein each of the grow towers comprises a plurality of plug containers disposed along the tower body.

15. The crop production system of claim 14 wherein each of the plurality of grow towers comprises a first plurality of plug containers arranged along a first face of the grow tower.

16. The crop production system of claim 15 wherein each of the plurality of grow towers comprises a second plurality of plug containers arranged along a second face of the grow tower, wherein the second face is opposite to the first face, and wherein each of the plurality of grow towers includes a central wall defining a first cavity containing the first plurality of plug containers and a second cavity containing the second plurality of plug containers.

17. The crop production system of claim 16 wherein each funnel comprises a collector;
- first and second passageways in fluid communication with the collector;
- a first slot disposed in the collector and in the fluid communication path between the collector and the first passageway; and
- a second slot disposed in the collector trough and in the fluid communication path between the collector trough and the second passageway;
- wherein the first and second slots are arranged to cause fluid to accumulate in the collector trough and distribute the fluid substantially evenly to the first and second passageways, the first passageway in fluid communication with the first cavity, and the second passageway in fluid communication with the second cavity.

18. The crop production system of claim 12 wherein the spacing of the select positions increase in a first direction such that spacing of the grow towers increases as such grow towers are pushed along the grow line.

19. The crop production system of claim 12 wherein each of the plurality of grow towers comprises a hook attached to the top of the grow tower, wherein the hook is configured to engage the grow line.

20. The crop production system of claim 19 wherein each of the grow lines includes a groove region to which the hook of a grow tower slidably attaches.

21. The crop production system of claim 1 wherein the select position is offset from a second position; and wherein the control system is operative to cause the grow conveyance mechanism to implement a datum sequence to move a grow tower from the select position to the second position.

22. A method of operating the crop production system of claim 1 comprising
- actuating the grow conveyance mechanism a plurality of cycles to extract a corresponding plurality of grow towers from the grow line in a first batch process; and
- actuating the tower shuttle mechanism to load a second plurality of grow towers onto the grow line during a second batch process after the first batch process.

* * * * *